(12) United States Patent
Parsons et al.

(10) Patent No.: US 8,589,474 B2
(45) Date of Patent: *Nov. 19, 2013

(54) SYSTEMS AND METHODS FOR SOFTWARE AND FILE ACCESS VIA A DOMAIN NAME

(75) Inventors: Robert Parsons, Scottsdale, AZ (US); Warren Adelman, Scottsdale, AZ (US); Michael Chadwick, Chandler, AZ (US); Eric Wagner, Scottsdale, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 608 days.

This patent is subject to a terminal disclaimer.

(21) Appl. No.: 12/140,460

(22) Filed: Jun. 17, 2008

(65) Prior Publication Data

US 2009/0313321 A1 Dec. 17, 2009

(51) Int. Cl.
*G06F 15/16* (2006.01)

(52) U.S. Cl.
USPC .............................. 709/203; 725/39; 725/51

(58) Field of Classification Search
USPC ........................................................ 709/203
See application file for complete search history.

(56) References Cited

U.S. PATENT DOCUMENTS

| | | | |
|---|---|---|---|
| 5,809,242 A | 9/1998 | Shaw et al. | |
| 5,819,285 A | 10/1998 | Damico et al. | |
| 5,887,133 A | 3/1999 | Brown et al. | |
| 6,085,229 A | 7/2000 | Newman et al. | |
| 6,671,715 B1 | 12/2003 | Langseth et al. | |
| 6,868,444 B1* | 3/2005 | Kim et al. | 709/223 |
| 7,099,948 B2 | 8/2006 | Tormasov et al. | |
| 7,197,545 B1* | 3/2007 | Davie | 709/220 |
| 7,414,981 B2* | 8/2008 | Jaramillo et al. | 370/252 |
| 7,487,546 B1 | 2/2009 | Szor | |
| 2002/0152224 A1* | 10/2002 | Roth et al. | 707/104.1 |
| 2003/0069953 A1* | 4/2003 | Bottom et al. | 709/223 |
| 2003/0120502 A1* | 6/2003 | Robb et al. | 705/1 |
| 2003/0229900 A1* | 12/2003 | Reisman | 725/87 |
| 2004/0088422 A1* | 5/2004 | Flynn et al. | 709/229 |
| 2004/0205200 A1 | 10/2004 | Kothari et al. | |
| 2005/0050218 A1* | 3/2005 | Sheldon | 709/231 |
| 2005/0076326 A1* | 4/2005 | McMillan et al. | 717/100 |
| 2005/0234921 A1 | 10/2005 | King et al. | |
| 2006/0100912 A1* | 5/2006 | Kumar et al. | 705/4 |
| 2006/0136720 A1* | 6/2006 | Armstrong et al. | 713/164 |
| 2007/0008973 A1 | 1/2007 | Galea | |
| 2007/0150363 A1 | 6/2007 | Patrawala | |
| 2007/0192818 A1* | 8/2007 | Bourges-Sevenier et al. | 725/132 |
| 2008/0046340 A1 | 2/2008 | Brown | |
| 2008/0141237 A1 | 6/2008 | Elad et al. | |
| 2009/0254610 A1* | 10/2009 | Arthursson | 709/203 |
| 2009/0313320 A1 | 12/2009 | Parsons et al. | |
| 2009/0313321 A1 | 12/2009 | Parsons et al. | |
| 2009/0313363 A1 | 12/2009 | Parsons et al. | |
| 2009/0313364 A1 | 12/2009 | Parsons et al. | |

OTHER PUBLICATIONS

"Plesk 8.3 for Windows Administrators Guide," 2007, SWsoft Holdings, Ltd., Revision 1.0, All Pages.*

(Continued)

*Primary Examiner* — Tauqir Hussain
(74) *Attorney, Agent, or Firm* — Chris A. Watt

(57) ABSTRACT

Systems and methods of the present invention allow for a thin client which may be provided with a domain name in a partnership between a hosting provider, an ISP and/or a thin client retailer. The client may be used to access a remote computer or server in the hosting provider's data center.

16 Claims, 10 Drawing Sheets

(56) References Cited

OTHER PUBLICATIONS

Unpublished U.S. Appl. No. 10/407,967.
Unpublished U.S. Appl. No. 10/703,245.
Unpublished U.S. Appl. No. 10/811,616.
Unpublished U.S. Appl. No. 11/708,737.
Unpublished U.S. Appl. No. 11/708,736.
Unpublished U.S. Appl. No. 11/708,729.
Unpublished U.S. Appl. No. 11/708,976.
Unpublished U.S. Appl. No. 11/746,505.
Unpublished U.S. Appl. No. 12/024,785.
Unpublished U.S. Appl. No. 12/024,764.
Unpublished U.S. Appl. No. 12/024,793.
Unpublished U.S. Appl. No. 12/024,802.
Peter Galli, "Microsoft looks ahead," Magazine, eWeek, Mar. 3, 2008, pp. 14-15.
Mar. 4, 2010 Non-Final Office Action in related application No. 12140450.
Mar. 4, 2010 Non-Final Office Action in related application No. 12140460.
"Getting Started with Linux Shared Hosting", Dec. 7, 2006,2.0, All.
Mar. 18, 2011 Non-Final Rejection, U.S. Appl. No. 12/140,450 (Publication US 2009-0313363 A1).
May 24, 2011 Response to Mar. 18, 2011 Non-Final Rejection, U.S. Appl. No. 12/140,450 (Publication US 2009-0313363 A1).
Apr. 1, 2011 Non-Final Rejection, U.S. Appl. No. 12/140,454 (Publication US 2009-0313364 A1).
May 24, 2011 Response to Apr. 1, 2011 Non-Final Rejection, U.S. Appl. No. 12/140,454 (Publication US 2009-0313364 A1).
Apr. 15, 2011 Non-Final Rejection, U.S. Appl. No. 12/140,459 (Publication US 2009-0313320 A1).
May 24, 2011 Response to Apr. 15, 2011 Non-Final Rejection, U.S. Appl. No. 12/140,459 (Publication US 2009-0313320 A1).
Aric Peterson, "cPanel User Guide and Tutorial", Mar. 2006, Packt Publishing, All.
"Getting Started with Windows Shared Hosting", Apr. 9, 2007, Godaddy, Version 2.1.
Jul. 25, 2011 Final Rejection, U.S. Appl. No. 12/140,450 (Publication US 2009-0313363 A1).
Sep. 28, 2011 Response (Appeal) to Jul. 25, 2011 Final Rejection, U.S. Appl. No. 12/140,450 (Publication US 2009-0313363 A1).
Jul. 25, 2011 Final Rejection, U.S. Appl. No. 12/140,454 (Publication US 2009-0313364 A1).
Sep. 28, 2011 Response (Appeal) to Jul. 25, 2011 Final Rejection, U.S. Appl. No. 12/140,454 (Publication US 2009-0313364 A1).
Jul. 25, 2011 Final Rejection, U.S. Appl. No. 12/140,459 (Publication US 2009-0313320 A1).
Sep. 28, 2011 Response (Appeal) to Jul. 25, 2011 Final Rejection, U.S. Appl. No. 12/140,459 (Publication US 2009-0313320 A1).
"Plesk 8.3 for Windows Administrator's Guide," 2007, SWsoft Holdings, Ltd., Revision 1.0, All Pages.
Chris Karakas, and Claudio Erba, "PHP-Nuke: Management and Programming," Revision Feb. 1, 2005, All Pages.
Aug. 17, 2010 Final Rejection, U.S. Appl. No. 12/140,450 (Publication US 2009-0313363 A1).
Nov. 10, 2010 Response to Aug. 17, 2010 Final Rejection, U.S. Appl. No. 12/140,450 (Publication US 2009-0313363 A1).
Aug. 18, 2010 Final Rejection, U.S. Appl. No. 12/140,454 (Publication US 2009-0313364 A1).
Nov. 10, 2010 Response to Aug. 18, 2010 Final Rejection, U.S. Appl. No. 12/140,454 (Publication US 2009-0313364 A1).
Aug. 16, 2010 Final Rejection, U.S. Appl. No. 12/140,459 (Publication US 2009-0313320 A1).
Nov. 10, 2010 Response to Aug. 16, 2010 Final Rejection, U.S. Appl. No. 12/140,459 (Publication US 2009-0313320 A1).
Aug. 6, 2010 Final Rejection, U.S. Appl. No. 12/140,460 (Publication US 2009-0313321 A1).
Nov. 8, 2010 Response to Aug. 6, 2010 Final Rejection, U.S. Appl. No. 12/140,460 (Publication US 2009-0313321 A1).

* cited by examiner

SYSTEMS AND METHODS FOR SOFTWARE AND FILE ACCESS VIA A DOMAIN NAME

CROSS REFERENCE TO RELATED PATENT APPLICATIONS

This patent application is related to the following concurrently-filed patent applications:

U.S. patent application Ser. No. 12/140,454, "DIRECT ACCESS DOMAIN-BASED COMPUTER SYSTEM WITH SOFTWARE AND FILE ACCESS."

U.S. patent application Ser. No. 12/140,459, "BRANDED AND COMARKETED DOMAIN-BASED THICK CLIENT SYSTEM."

U.S. patent application Ser. No. 12/140,460, "BRANDED AND COMARKETED DOMAIN-BASED THIN CLIENT SYSTEM."

The subject matter of all patent applications is commonly owned and assigned to Go Daddy Operating Company, LLC. All prior applications are incorporated herein in their entirety by reference

FIELD OF THE INVENTION

The present invention generally relates to the field of Domain Names and Remote Computing and, more specifically, systems and methods for using a domain name in conjunction with a client to access a remote computer or server system in a hosting provider's data center.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The username/password system is a common form of secret authentication data used to control website access. The username/password is kept secret from those not allowed access. Those wishing to gain access are tested on whether or not they have a valid (recognized) username and whether they know the associated password. Internet users are granted or denied access to websites accordingly.

SUMMARY OF THE INVENTION

The present invention provides systems and methods for using a domain name in conjunction with a client to access a remote computer or server system in a hosting provider's data center, thus overcoming substantial limitations in the relevant art.

In an example embodiment, a computer or server may be hosted in a data center of a hosting provider, wherein the hosting provider may be capable of updating the computer or server as needed. The computer or server may comprise a plurality of virtual environments and/or a portal website with at least one online community, at least one website storage area, at least one portal management webpage accessible to the registrant or hosting provider after successful authentication, at least one email webpage, or any combination thereof The computer or server may be part of a storage area network, thereby creating unlimited additional storage space for the computer or server.

A domain name may be registered to a registrant, who may also be provided with a co-marketed and/or branded thick or thin client. The client may use the domain name to access the computer or server remotely, using a remote desktop program, a web browser or other client software, and may access the computer or server via an infrastructure provided by a broadband or internet service provider.

An exemplary method of hosting a remote computer or server in a hosting data center may comprise a plurality of steps including registering a domain name to a registrant. Following the registration of the domain name, the domain name may be mapped to a computer or server in a data center of a hosting provider, and the hosting provider may provide updates as needed to the computer or server. The registrant may then be provided with authenticated remote access, via a remote desktop program on a client to the file system and one or more virtual environments on the computer or server. Cloud computing may be used to install additional software or utilities needed by the Registrant or for any other needed applications of cloud computing. As more space is needed, the computer may be storage area networked to provide unlimited additional storage space as needed by the user.

Another exemplary method of hosting a portal website on a hosting computer or server in a data center of a hosting provider may comprise a plurality of steps including registering a domain name to a registrant. Following the registration of the domain name, the domain name may be mapped to a portal on the hosting computer or server, and the server may be updated as needed by the hosting provider. The registrant may then be provided with remote access, via a browser or other client software on a client to the portal. Cloud computing may be used to install additional software or utilities needed by the registrant or for any other needed applications of cloud computing. As more space is needed, the computer or server may be storage area networked to provide unlimited additional storage space as needed by the user.

An exemplary remote computer or server system in a hosting provider's data center may comprise at least one computer or server in a data center of a hosting provider owned by the hosting provider and communicatively coupled to a network, wherein the hosting provider is capable of updating the computer or server as necessary. The connection to the network may be provided by an infrastructure owned and/or operated by a broadband or internet service provider.

A domain name registered to a registrant and entered into a remote desktop program, a web browser and/or other client software on a thick or thin client may be used to access the computer or server or a portal website on the hosting computer or server. The thick or thin client may be branded and co-marketed in a partnership between a hosting provider, a broadband and/or Internet Service Provider, a thick and/or thin client retailer or any combination thereof.

The portal may further comprise a plurality of portal web pages on the portal website having direct access domains, links and/or other means for selecting or accessing at least one community webpage or other online software or utilities, at least one website storage area or other storage areas, at least one portal management webpage or other control panels accessible to the registrant after successful authentication, at least one email webpage, or any combination thereof.

The computer or server may be communicatively coupled to a storage area network, which may provide unlimited additional storage space to the registrant. The community webpage and/or cloud computing may also be used to allow the registrant to access, download and/or install additional software or utilities or any other needed application of cloud computing.

The above features and advantages of the present invention will be better understood from the following detailed description taken in conjunction with the accompanying drawings.

DETAILED DESCRIPTION

Figure 1:
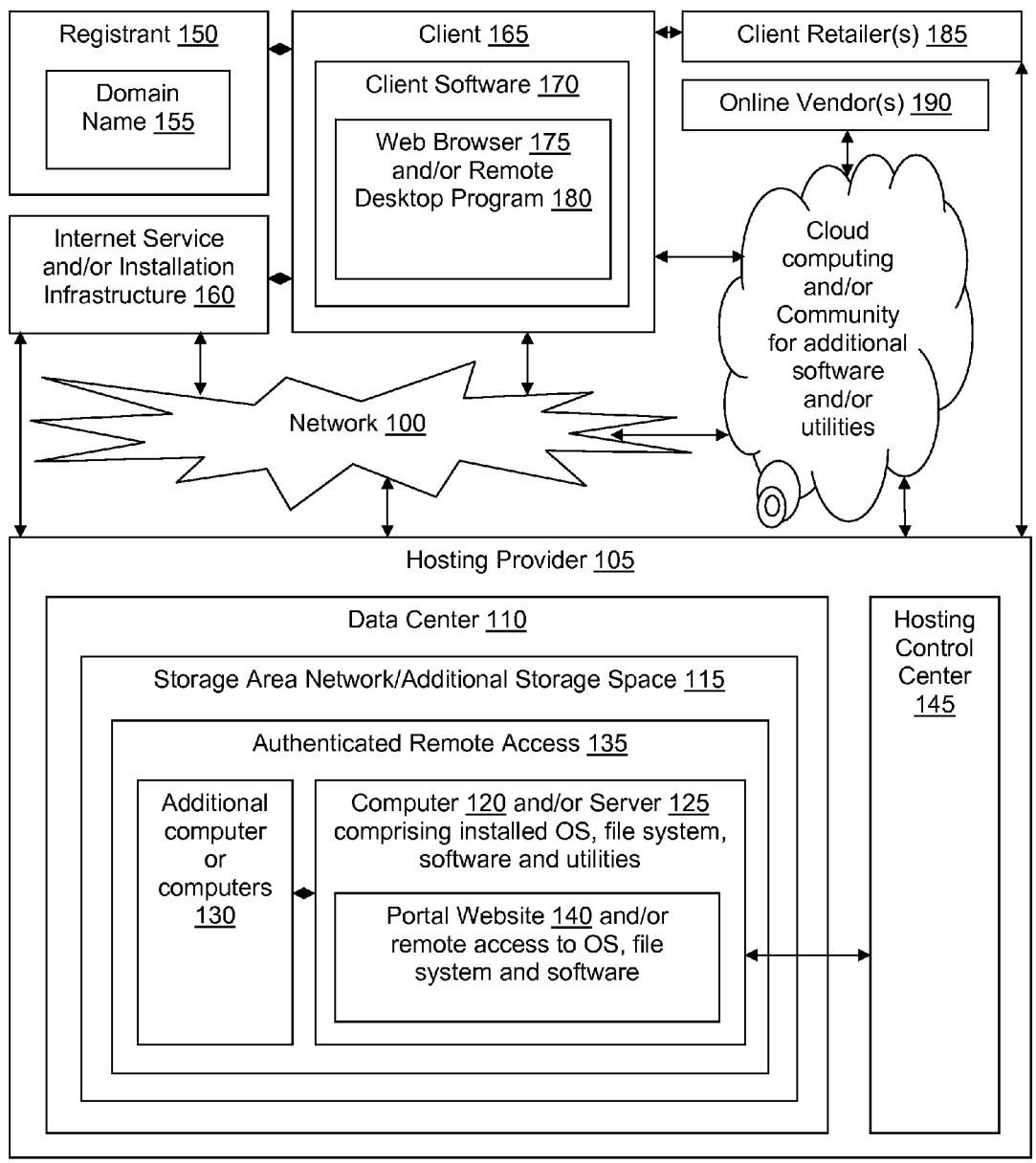
FIG. 1 illustrates a possible streamlined embodiment of a remote computer or server system.

The present inventions will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A streamlined Remote Computer and/or Server System

As shown in a streamlined example embodiment of a remote computer and/or server system shown in FIG. 1, the remote computer and/or server system may include a Network 100. A Hosting Provider 105 may host one or more Computers 120, Servers 125 and/or Additional Computers 130 in a Data Center 110 owned by the Hosting Provider 105 and communicatively coupled to the Network 100. The one or more Computers 120, Servers 125 and/or Additional Computers 130 may be communicatively coupled to each other and to the Network 100 and configured in such a way as to constitute a Storage Area Network 115 which may provide unlimited Additional Storage Space 115 for applications, files, documents, backups, software, etc. A Hosting Control Center (HCC) 145 may be used by the Hosting Provider 105 to access, restart or install, possibly automatically, one or more patches, upgrades, backups, applications, utilities, software or any combination thereof for the Computers 120, Servers 125 and/or Additional Computers 130.

The example embodiments herein place no limitation on network configuration or connectivity. Thus, as non-limiting examples, the Network 100 could comprise the Internet, an intranet, an extranet, a local area network, a wide area network, a wired network, a wireless network, a telephone network, any other network now known in the art or later developed in the future or any combination thereof.

The Hosting Provider 105 may provide hosting services including, but not limited to hosting one or more Computers 120, Servers 125 and/or Additional Computers 130 in a Data Center 110 as well as providing the general infrastructure necessary to offer hosting services to Internet users including hardware, software, Internet web sites, hosting servers, and electronic communication means necessary to connect multiple Computers 120, Servers 125 and/or Additional Computers 130 to the Internet or any other Network 100.

The general infrastructure necessary to offer hosting and/or Internet services as described above is not limited to the Hosting Provider 105. Any Broadband or other Internet Service Provider (ISP) with an Internet Service or any other solution based on TCP/IP networks or configurations may provide an Internet Service and/or Installation Infrastructure 160 to allow connection to the Internet or other Network 100. Such infrastructures may be similarly compatible with the configuration of the system and methods disclosed herein thereby allowing the ISP to partner with the Hosting Provider 105 to install, provide services and maintain such hardware, software, Internet web sites, hosting servers, electronic communication or other means necessary to connect multiple Computers 120, Servers 125, Additional Computers 130 and/or Clients 165 to the Internet or any other Network 100.

The ISP described above may be defined as a company or business that provides broadband or other access to the Internet and related services. Non-limiting examples of ISP-specific services may include, but are not limited to dial-up, DSL possibly as ADSL, Broadband wireless access, Cable modem, FTTH, ISDN possibly as BRI, DSL possibly as SHDSL or ADSL, Ethernet, Metro Ethernet, Gigabit Ethernet, Frame Relay, ISDN possibly as BRI or PRI, ATM, satellite Internet access and SONET.

In addition to providing hosting or other Internet services, the Hosting Provider 105 may also offer other products and services, especially those that a user may be likely to purchase. For example, the Hosting Provider 105 may also be a registrar or reseller of domain names, an issuer of SSL certificates and may also sell other products related to domain names, hosting services, and electronic commerce, including being a Client Retailer 185 or Online Vendor 190 of software or other products or services. Thus, in the current invention, the Hosting Provider 105 may have the means to both register a Domain Name 155 to the Registrant 150 as well as map the Domain Name 155 to the Computer 120 and/or Server 125 hosted in the Data Center 110, both of which are disclosed in greater detail below.

The one or more Computers 120, Servers 125 and/or Additional Computers 130 may be any computer or program that provides services to other computers, programs, or users either in the same computer or over a computer Network 100. As non-limiting examples, the one or more Computers 120, Servers 125 and/or Additional Computers 130 could be an application, communication, mail, database, proxy, fax, file, media, web, peer-to-peer, software or standalone computer which may contain an operating system, a full file system, a plurality of other necessary utilities software or applications or any combination thereof on the one or more Computers 120, Servers 125 and/or Additional Computers 130. The one or more Computers 120, Servers 125 and/or Additional Computers 130 may likewise have any server capabilities utilizing any server technology or format known in the art or developed in the future, possibly, but not limited to, a shared hosting server, a virtual dedicated hosting server, a dedicated hosting server, or any combination thereof.

The Server 125 may have the hardware and software needed for dedicated hosting, virtual dedicated hosting, shared hosting, managed hosting, temporary time sliced hosting, and/or any other types of hosting that are currently known or will be developed in the future. Dedicated hosting may place a single hosted web site on a single hosting Server 125. This provides a user with the maximum amount of resources (bandwidth, memory space, etc.), but it is also the most expensive. Virtual dedicated hosting allows a plurality of users to be placed on a single Server 125. Software may be used on the virtual dedicated Server(s) 125 to provide much of the same functionality as dedicated hosting, with lower cost. Shared hosting allows a very large number, potentially thousands, of users to use the resources of a single Server 125. This greatly lowers the cost, but also may limit the capabilities and resources that may be used by each shared user.

The one or more Computers 120, Servers 125 and/or Additional Computers 130 may be located and hosted in a single Data Center 110 facility owned by the Hosting Provider 105. A Client 165, discussed in more detail below, may act as a head to the system, thus allowing the Computer 120 and/or Server 125 to operate under headless operation. In other words, the only required hardware for the Computer 120 or Server 125 may include an Ethernet card and at least one Client 165. No monitor or keyboard need be attached to the Computer 120 or Server 125 and no peripherals such as a video card need be included. Thus, the Computer 120 and/or Server 125 in the Data Center 000 may operate effectively with no dedicated hardware.

Due to practical considerations, multiple Data Centers 110 may be required if a single Data Center 110 is not able to physically house and provide all resources needed. If a plurality of Data Centers 110 is used, they may be connected via a high speed network such as a Local Area Network (LAN), Wide Area Network (WAN), Internet or other high speed packet-switched network as disclosed elsewhere in this application and incorporated herein by reference. Each Data Center 110 may have a central hub coordinating the Computers 120, Servers 125 and/or Additional Computers 130 at that Data Center with other central hub(s), thereby coordinating the Computers 120, Servers 125 and/or Additional Computers 130 in their respective Data Center(s) 110.

The Computer 120, Server 125 and/or any Additional Computer 130 or complimentary Client 165 may be communicatively coupled to a Network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

In the non-limiting example embodiment shown in FIG. 1, Authenticated Remote Access 135 may be provided to any installed Operating System (OS), file system, software, utilities or any combination thereof on the Computer 120 and/or Server 125. Authentication for the Authenticated Remote Access 135 may be defined as the process of attempting to verify the identity of the sender of a communication, such as a request to log in or access a resource. The thing being authenticated may be, but is not limited to, a person using a Client 165 or other system, a computer itself, or a computer program.

As non-limiting examples, authentication may utilize any weak or strong authentication system known in the art or developed in the future, such as username/password, challenge/response, OpenID, MICROSOFT CARDSPACE, any Single Sign-On (SSO) methodology, Public Key Infrastructure (PKI), digital signatures, zero-knowledge proofs, Kerberos, smart card, biometrics (retina, voice, fingerprint, or DNA recognition) and/or and combination thereof. The authentication environment may further be secured with antivirus software, firewalling and/or at least one virtual private network.

There should be no limitation on the type of OS or file system which may be installed, accessed and/or used on the one or more Computers 120, Servers 125 and/or Additional Computers 130 in the Data Center 110 or on the complimentary Client 165. As non-limiting examples, an OS based on WINDOWS, UNIX, MAC OS etc. may be installed and used on any of the aforementioned systems.

Linux may be preferred in such a network environment for a plurality of reasons, including, but not limited to the following: a complete absence of licensing costs for the operating system on Computers 120, Servers 125 and/or Additional Computers 130; low risks of virus attacks; VMWare support for multiple operating systems and other major protocols for file sharing and other tasks; low system requirements for running Linux on an Intel-based Computer 120 and/or Server 125 which may also offer Linux terminal server possibilities.

Linux terminal server is a non-limiting example of any of the plurality of terminal server or remote desktop programs available in the art which may be used in conjunction with the current invention. Any such terminal service or remote desktop program may be a configuration interface which allows the application to run on the Computer 120 or Server 125 while the user interface is rendered on any compatible remote Client 165. The terminal server or remote desktop program may further allow the uploading and downloading of files between the Computer 120, Server 125 and/or Additional Computer 130 and the remote Client 165. This configuration interface may also act as a Remote Desktop Protocol (RDP) gateway, allowing remote control of the Computer 120 or Server 125 over the Internet, or any other network solution based on TCP/IP networks or Networks 100 similarly compatible with the configuration disclosed herein.

The operating system and full file system may utilize virtualization to allow multiple users to access the resources available in the Data Center 110 of the Hosting Provider 105. Virtualization or Virtual Private Hosting (VPH) may be defined as a method of partitioning a physical Computer 120 or Server 125 into multiple operating systems, environments (also referred to as containers) and/or servers such that each has the appearance and capabilities of running on its own dedicated machine. Each installed virtual environment and/or server may run its own full-fledged installed OS, and each environment or server may be independently rebooted, possibly via the HCC 145 described above and incorporated herein by reference. Two kinds of virtualizations may exist and be used in the Data Center 110 environment: hardware based and operating system or software based.

In a hardware-based virtualization environment, the virtualization mechanism may partition the real hardware resources. Non-limiting examples of hardware-based virtualization may include but are not limited to Microsoft Virtual Server, QEMU, Xen, UML, VMware ESX Server, VMware Workstation suite, VMware Fusion and VMware ACE. As an alternative to hardware based virtualization, software or operating system based virtualization may also be used.

Operating system level virtualization, rather than attempting to virtualize a complete set of hardware, may virtualize at the operating system level, and so may not require hardware assistance to perform efficiently. Rather, operating system based virtualization may virtualize an operating system instance, thereby imposing lower or no overhead. As a result, more virtual environments (VE), "containers," virtual private servers (VPS) and/or virtual dedicated servers (VDS) may be supported on a given Computer 120 or Server 125. In such a software based VE, each OS and/or VE may be installed and share the same kernel, may require the main node's resources, and may behave in most respects as if it were a stand-alone computer or server.

Operating system-level virtualization may allow for the kernel of an operating system to have multiple isolated userspace instances instead of just one, so every user may work in their own space with the look and feel of having a real computer or server from the point of view of its respective user. This may allow each user to retain a degree of ownership over their own respective standard work environment, while making the most efficient use of the Hosting Provider's 105 resources in a controlled environment.

Each VE may have, as non-limiting examples, its own superuser (root or Administrator), set of users/groups, IP address(es), processes, files, applications, system libraries configuration files or any combination thereof. Non-limiting examples of software or operating system-based virtualization may include but are not limited to OpenVZ, Virtuozzo, HyperVM, Vserver, Solaris Containers, Solaris Zones, and FreeBSD Jail.

The file system may be structured so that all the information including centralized data storage, central backup and central email or any other divisions of the VE may be stored in the home directory of the user on the Computer 120 or Server 125. Because they rely on the services of a single kernel, all VEs on a given Computer 120 or Server 125 may run the same kernel, but everything else including, but not limited to system libraries, configuration and program files may be different in different VEs.

Likewise, because the VPS or VE may run its own copy of its OS, users may have superuser-level access to that OS instance, and may install and remotely access through a network almost any software that runs on the OS. Typical scenarios may include separating several applications to separate VEs for improved security, hardware independence, and added resource management features. The result may be a complete graphical windows or X-windows workstation, with all necessary office and internet tools and utilities.

Non-limiting examples of such software and utilities available may include OpenOffice or Star Office. Either of these may allow the Client 165 running in a thin or thick client concept to be able to remotely access all the necessary office and Internet tools or other standard software or utilities needed which reside on the computer or server.

As an alternative to direct access to the OS, file systems and other software or utilities on the Computer 120 or Server 125, a hosting Computer 120 or Server 125 may host a Portal Website 140, which is described in more detail elsewhere in this application and incorporated herein by reference, consisting of a collection of web pages, files, documents, server-side applications, control panels, community websites, other software or utilities, or any combination thereof.

The one or more Computers 120, Servers 125 and/or Additional Computers 130 may be communicatively coupled together and configured in such a way as to constitute a Storage Area Network 115 which may provide unlimited Additional Storage Space 115 for applications, files, documents, backups, software etc. A Storage Area Network (SAN) 115 may be defined as an architecture to attach remote computer storage devices, including, but not limited to one or more Additional Computers 130, disk arrays, tape libraries and/or optical jukeboxes to Computers 120 and/or Servers 125 in such a way that, to the OS, the devices appear as locally attached. The scope of this invention is not limited to SANs 115 and may also include Network Attached Storage, Direct Attached Storage, or any combination thereof.

A SAN 115 may connect "storage islands" such as the one or more Computers 120, Servers 125 and/or Additional Computers 130 together using a high-speed or other Network 100, thus allowing all applications to access all disks. Sharing data between computers through a SAN 115 may require advanced solutions, such as SAN 115 file systems or clustered computing, and may be used to help increase storage capacity utilization. Non-limiting examples of applications of a SAN 115 may include the use of transactionally accessed data such as email servers, databases, and high usage file servers. The definition and scope of the SAN 115, for purposes of this disclosure, may further be augmented to include storage virtualization and cloud storage.

Storage virtualization refers to the process of completely abstracting logical storage from physical storage. The physical storage resources may be aggregated into storage pools, from which the logical storage may be created. It may present to the user a logical space for data storage and transparently handle the process of mapping it to the actual physical location. This may be used to "virtualize" multiple disk arrays, made by different vendors, scattered over the network, into a single monolithic storage device, which can be managed uniformly.

In the case of multiple Data Centers 110 described above, cloud storage may be used. Cloud storage refers to a model of networked data storage where data may be stored on multiple virtual servers, generally hosted by third parties, rather than being hosted on dedicated servers. Hosting Providers 105 may operate large Data Centers 110, and people who require their data to be hosted may buy or lease storage capacity from them, possibly in the form of Additional Computers 130, and use it for their storage needs. The Data Center 110 operators, in the background, may virtualize the resources according to the requirements of the customer and expose them as virtual servers, which the customers may then manage. Physically, the resource may span across multiple servers. In some services, the system may span multiple Data Centers 110 or even continents. One non-limiting example of such a service is Nirvanix.

A Hosting Control Center (HCC) 145 may be used by the Hosting Provider 105 to access and automatically install one or more patches, upgrades, backups, applications, utilities, software or any combination thereof for the Computers 120, Servers 130 and/or Additional Computers 130. The HCC 145 may be accessible to a Registrant 150 and/or the Hosting Provider 105 and may be provided for controlling different parameters or operating conditions of the Computers 120, Servers 130 and/or Additional Computers 130. As non-limiting examples, in addition to automatically installing the most recent version of one or more patches, upgrades, backups, applications, utilities or any combination thereof, the Registrant 150 and/or the Hosting Provider 105 may be able to remove or reinstall an application, change passwords, set basic configuration settings, migrate applications between different hosting accounts and domains or even restart the Computers 120, Servers 130 and/or Additional Computers 130 from the HCC 145, as well as providing any other control-panel related utilities now known or later developed in the art.

The HCC 145 may further comprise a client interface used to remotely perform administrative tasks, such as remotely installing software or remotely restarting the Computers 120, Servers 130 and/or Additional Computers 130. The Authenticated Remote Access 135 may be used in conjunction with the HCC 145 connections to the Computers 120, Servers 130 and/or Additional Computers 130 to establish a remote access gateway.

In the streamlined example embodiment illustrated in FIG. 1, A Domain Name 155 may be registered to a Registrant 150 and mapped to a Computer 120 or Server 125 in the Data Center 110 of a Hosting Provider 105. The Registrant 150 may use the Domain Name 155 in conjunction with Client Software 170 such as a Web Browser 175 and/or a Remote Desktop Program 180 on a Client 165 communicatively coupled to a Network 100 to access the Computer 120 or Server 125.

The means for registering the Domain Name 155 may comprise any domain name registration system known in the art or developed in the future including, but not limited to, domain name registration services offered by domain name registries, registrars, and/or resellers (e.g., GODADDY.COM). The process for registering a Domain Name 155 with .com, .net, .org, and some other TLDs allows an Internet user to use an ICANN-accredited registrar to register their Domain Name 155.

For example, if an Internet user, John Doe, wishes to register the domain name "mycompany.com," John Doe may initially determine whether the desired Domain Name 155 is available by contacting a domain name registrar. The Internet user may make this contact using the registrar's webpage and typing the desired Domain Name 155 into a field on the registrar's webpage created for this purpose. Upon receiving the request from the Internet user, the registrar may ascertain whether "mycompany.com" has already been registered by checking the SRS database associated with the TLD of the Domain Name 155.

The results of the search then may be displayed on the webpage to thereby notify the Internet user of the availability of the Domain Name 155. If the Domain Name 155 is available, the Internet user may proceed with the registration process. Otherwise, the Internet user may keep selecting alternative domain names until an available Domain Name 155 is found.

The Registrant 150 may be an individual or an entity including, but not limited to, a person, a business, a governmental institution, an educational institution, a non-profit organization, or a social organization or any other individual or organization capable of registering domain names.

As previously disclosed, the Hosting Provider 105, in addition to providing hosting services may also be a registrar or reseller of domain names and may have the means to both register a Domain Name 155 to the Registrant 150 as well as map the Domain Name 155 to the Computer 120 and/or Server 125 hosted in the Data Center 1 10. For purposes of this disclosure, the mapped Domain Name 155 may also include any Uniform Resource Locator (URL) or Internet Protocol (IP) address related to the Domain Name 155.

This mapping may be a client or server-based software tool that may perform the mapping function automatically based on a Domain Name 155, a sub-domain or IP address and/or URL information registered to the Registrant 150 to point the Domain Name 155 to the Computer 120 and/or Server 125 hosted in the Data Center 110 of the Hosting Provider 105.

The mapping may use any method and/or technology known in the art or developed in the future for mapping a Domain Name 155 to a hosted Computer 120 and/or Server 125 including, but not limited to URL forwarding, redirecting, masking and/or any combination thereof. Related URL forwarding, redirecting or masking may include, as is known in the art, manual redirection, using HTTP 3xx status codes, server-side redirection scripting, .htaccess files, meta refresh redirection, JavaScript redirects, frame redirects, and/ or redirect loops. Aliases also may be implemented to have the Computer 120 and/or Server 125 mapped to different domain names.

As with the one or more Computers 120, Servers 125 and/or Additional Computers 130, the Client 165 may be any computer or program that provides services to other computers, programs, or users either in the same computer or over a computer Network 100. As non-limiting examples, the Client 165 may be an application, communication, mail, database, proxy, fax, file, media, web, peer-to-peer, or standalone computer which may contain an operating system, a full file system, a plurality of other necessary utilities or applications or any combination thereof on the Client 165.

A Client 165 may be defined as any application or system including a computer, laptop, telephone, handheld device, etc. that accesses a service (possibly a remote service) on another computer system (generally, but not limited to a server or some type of hosting computer) by way of a network and/or devices that may or may not be capable of running their own stand-alone programs, but may interact with remote computers or systems via a network. The client may be a thick (also known as fat or rich) client, a thin client or a hybrid client, which is a mixture of a thick and thin client, in that it processes locally, but relies on a server for storage data.

A thick Client 165 may be defined as a client that performs the bulk of any data processing operations itself, and does not necessarily rely on the server. The thick Client 165 may include display, remote desktop and wifi capability or any combination thereof. Non-limiting examples of thick Clients 165 which may be used in the context of the current invention may include a mini-laptop, a wireless laptop, a simple, inexpensive PC desktop, a thick client integrated into a mobile phone and a hybrid dumb client.

A thin Client 165 may be defined as a minimal client that uses the resources of a host computer to graphically display software or utilities provided by the host computer or application server, the computer or server performing the bulk of any required data processing. The thin Client 165 may include display, remote desktop and wifi capability or any combination thereof. Non-limiting examples of thin Clients 165 which may be used in the context of the current invention may include a set top box, a thin client connected to a TV for TV display, a thin client integrated into a mobile phone and a dumb client.

Non limiting programming environments for Clients 165 may include JavaScript/AJAX (client side automation), ASP, JSP, Ruby on Rails, Python's Django, PHP, HTML pages or rich media like Flash, Flex or Silverlight. Such programming environments may be used to present the Registrant 150 with options relating to server-side applications in the context of the Portal Website 125.

Client Software 170 may be used for authenticated remote access to the installed OS, file system, software and/or utilities 135 on the Computer 120 or Server 125, and/or for authenticated remote access to the Portal Website 140 on the hosting Computer 120 or Server 125. These may be, but are not limited to being, accessed by a Remote Desktop Program 180 and/or a Web Browser 175 respectively.

The Remote Desktop Program 180 may be a configuration interface which allows the application to run on the Computer 120 and/or Server 125 while the user interface is rendered on the any compatible remote Client 165 on the appropriate Client Software 170. The Remote Desktop Program 180 may further allow the uploading and downloading of files between the Computer 120 and/or Server 125 and the remote Client 165. This configuration interface may also act as a Remote Desktop Protocol (RDP) gateway, allowing remote control of the Computer 120 and/or Server 125 over the Internet, or any other solution based on TCP/IP networks or any other Network 100 similarly compatible with the configuration disclosed herein.

The Authenticated Remote Access 135 to the Computer 120 and/or Server 125 may be accomplished as the Domain Name 155 is entered into Client Software 170, a Remote Desktop Program 180, a Web Browser 175 or any combination thereof on the Client 165. The Remote Desktop Program 180 may be integrated into or used in conjunction with the Web Browser 175 or other Client Software 170. As the Domain Name 155 may have been mapped to the Computer 120 or Server 125 hosted in the Data Center 110 of the Hosting Provider 105, the Domain Name 155 may resolve to the Computer 120 where access is provided to the Registrant 150.

Once access is provided to the Registrant 150 on the Client 165 through resolution of the entered Domain Name 155 mapped to the Computer 120, the Registrant 150 may be further provided Authenticated Remote Access 135 to an operating system, a full file system, a plurality of other necessary utilities, applications or software, a Portal Website 140 or any combination thereof on the Computer 120 or Server 125.

In addition to the roles previously described, the Hosting Provider 105 may also act as a retailer for the thick and/or thin Client 165 described above. The Hosting Provider 105 may design, assemble, sell and/or provide the thick and/or thin Client 165 to Registrants 150 as part of, or independent from, the sale and registration of a Domain Name 155 to the Registrant 150.

As an alternative, the Hosting Provider 105 may also provide the thick and/or thin Client 165 described above through one or more third party Client Retailers 185 who may design, assemble, sell and/or provide the thick and/or thin Client 165 to Registrants 150 as part of, or independent from, the sale and registration of a Domain Name 155 to the Registrant 150.

The Hosting Provider 105 may also partner with the one or more Client Retailers 185 and/or any ISP which may provide the broadband or other Internet Service and/or Installation Infrastructure 160 or any combination thereof to brand the thick and/or thin Clients 165 to reflect the partnership, and may co-market the thick and/or thin clients with the Client Retailers 185 and the ISP responsible for the Internet Service and/or Installation Infrastructure 160.

As shown in the streamlined example embodiment illustrated in FIG. 1, the standard software included in the Registrant's 150 virtual environment is not limited to that software included within the container, OS, VPS or virtual environment. The Registrant 150 may be provided with access to software or utilities which may be purchased and installed on the computer via an online Community of software vendors in a central location, or through cloud computing.

The Registrant 150 may have access to additional software or utilities through cloud computing which may be purchased and/or installed on the Computer 120 or Server 125. Such access may be in addition to using cloud computing for Authenticated Remote Access 135 to any installed OS, file system, software and/or utilities on the Computer 120 or Server 125 and/or for Authenticated Remote Access 135 to a Portal Website 140 on a hosting Computer 120 or Server 125. Cloud computing may also be used for any other software access or utility needed for the Computer 120, Server 125, Additional Computers 130 and/or Client 165.

Because of the Hosting Provider's 105 potential infrastructure of a Network 100, a plurality of Clients 165, Computers 120, Additional Computers 130 and/or Servers 125 and an Internet Service and/or Installation Infrastructure 160, cloud computing may be utilized as an alternative to having local servers or personal devices handling users' applications. In general, and for purposes of this specification, cloud computing may indicate that function comes from "the cloud." The cloud is often understood to mean a public network, possibly based on TCP/IP networks, specifically often assumed to be the Internet. Thus, function within the environment does not come from a specific identifiable device.

The architecture behind cloud computing may include a massive network of "cloud servers" interconnected as if in a grid running in parallel, sometimes using the techniques of virtualization described elsewhere in this disclosure and incorporated herein by reference, to maximize computing power per Computer 120 and/or Server 125. In general, and for purposes of this specification, cloud computing may represent a subset of grid computing that may include utility computing and other approaches to the use of shared computing resources.

As a result, the services that may be delivered from the cloud are not limited to web applications, but may also include storage, raw computing, or access to any number of specialized services as seen in the Storage Area Network 115, Portal Website 140, and software and utilities available on the Community of Online Vendors 190. This Community of Online Vendors 190 may exist as part of the Portal Website 140 or independently as part of the computing cloud. The online Community is further described in more detail in subsequent elements, steps and embodiments.

The application of cloud computing in this disclosure is not limited only to the accessing and downloading of utilities and applications, but may be applied to any element or step of the current invention which is capable of supporting cloud computing as now known or developed in the future. Non-limiting examples of cloud computing may include Amazon Elastic Compute Cloud, Nirvanix, 3tera, AppLogic, Joyent, Google App Engine, Live Mesh, Project Caroline, Skytap, Hatsize, etc.

A Method for Hosting a Remote Computer in a Hosting Data Center

Figure 2:
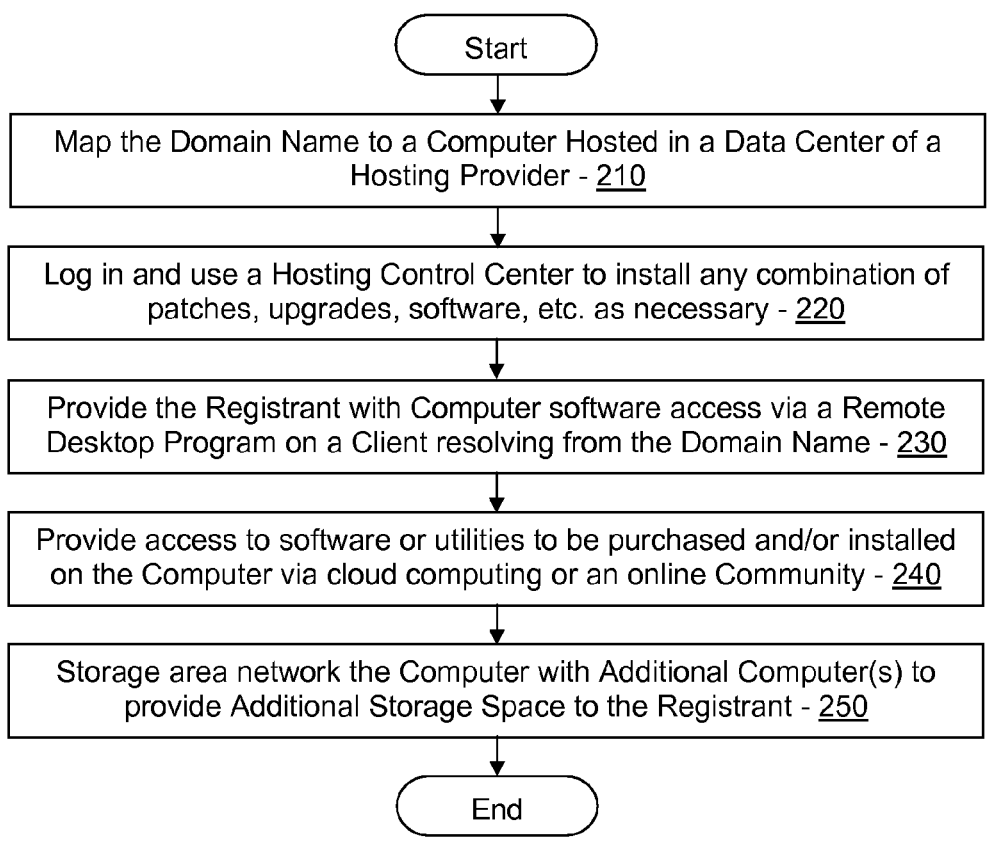
FIG. 2 is a flow diagram illustrating a possible embodiment of a method for hosting a remote computer or server in a hosting data center.

Several different methods may be used to host a remote computer in a hosting data center. In an example embodiment illustrated in FIG. 2, a Domain Name 155 may be registered to a Registrant 150 (Step 200), and the Domain Name 155 may then be mapped to a Computer 120 or Server 125 in a Data Center 110 of a Hosting Provider 105 (Step 210). The Hosting Provider 105 may install on the Computer 120, Server 125 and/or Additional Computers 130, via a HCC 145 and as necessary, the most recent version of one or more patches, upgrades, backups, applications, software, utilities or any combination thereof (Step 220), wherein the Hosting Provider 105 has access and the ability to log in to the Computer 120 or Server 125 to install the one or more patches, upgrades, backups, applications, software, utilities or any combination thereof.

The Registrant 150 may then be provided with Authenticated Remote Access 135, via a Remote Desktop Program 180 or other Client Software 170 such as a Web Browser 175 on a Client 165, to the Computer 120 or Server 125, wherein the access resolves from the Domain Name 155 and provides the Registrant 150 Authenticated Remote Access 135 to an installed OS, a full file system, a plurality of other necessary utilities or applications or any combination thereof on the Computer 120 or Server 125 (Step 230).

In addition, the Registrant 150 may be provided Authenticated Remote Access 135 to software or utilities which may be purchased and/or installed, from Online Vendors 190 onto the Computer 120 or Server 125 via cloud computing or through an online Community (Step 240). The Computer 120 or Server 125 may be communicatively coupled to at least one Additional Computer 130 in a Storage Area Network 115 (Step 250), thereby providing unlimited Additional Storage Space 115 assignable to the Registrant 150 for files, backups, application install packages, offline storage space, other software or any combination thereof.

A Method for Hosting a Portal Website in a Hosting Data Center

Figure 3:
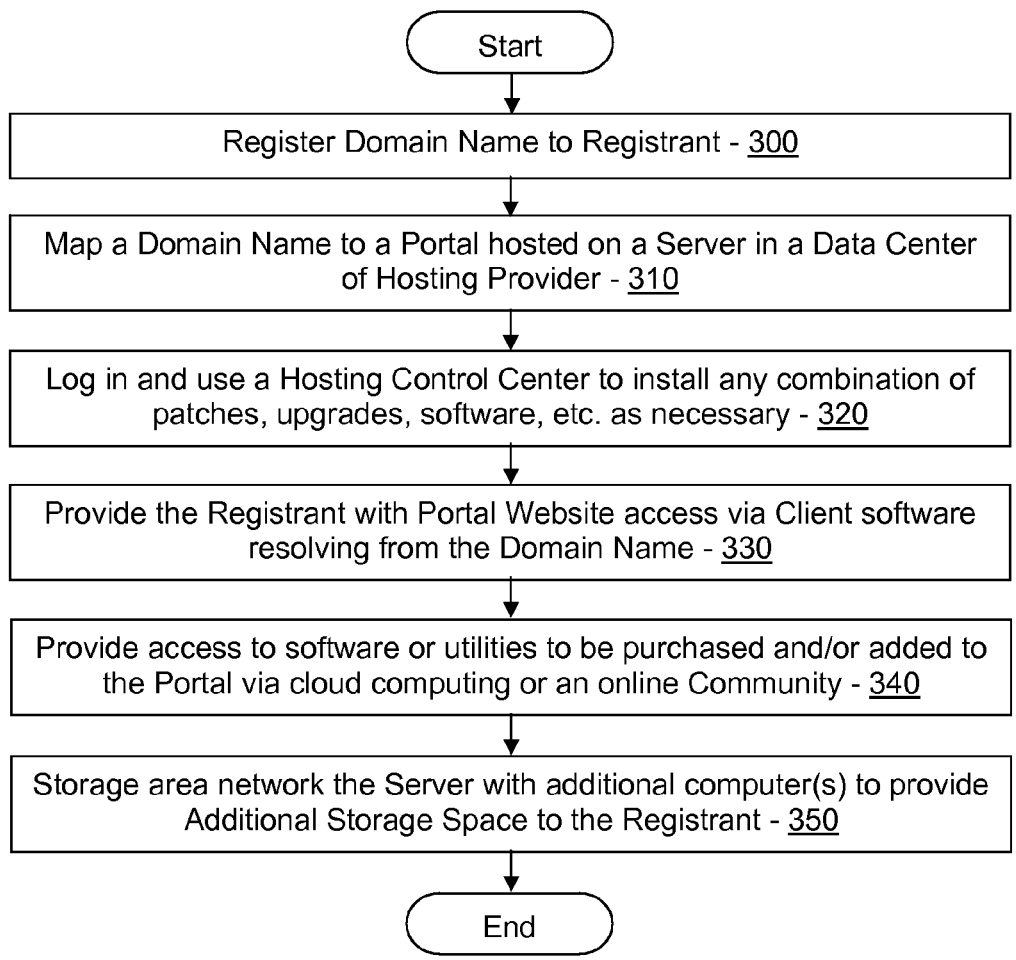
FIG. 3 is a flow diagram illustrating another possible embodiment of a method for hosting a remote computer or server in a hosting data center.

In another example embodiment illustrated in FIG. 3, a Domain Name 155 may be registered to a Registrant 150 (Step 300), and the Domain Name 155 may then be mapped to a Portal 140, hosted on a hosting Computer 120 and/or Server 125 in a Data Center 110 of a Hosting Provider 105 (Step 310) The Hosting Provider 105 may install on the hosting Computer 120, Server 125 and/or Additional Computers 130, via a Hosting Control Center 145 and as necessary, the most recent version of one or more patches, upgrades, backups, applications, software, utilities or any combination thereof (Step 320), wherein the Hosting Provider 105 has access and the ability to log in to the hosting Computer 120, Server 125 and/or Additional Computers 130 to install the one or more patches, upgrades, backups, applications, software, utilities or any combination thereof.

The Registrant 150 may then be provided with Authenticated Remote Access 135, via a Web Browser 175 and/or other Client Software 170 on a Client 165, to the Portal Website 140, wherein the access resolves from the Domain Name 155 and provides the Registrant 150 access to the Portal Website 140 (Step 330). The Registrant 150 may then be provided with access to online software or utilities which may be purchased and/or added to the Portal Website 140 via cloud computing or through an online Community (Step 340). In addition, the hosting Computer 120 and/or Server 125 may then be communicatively coupled to at least one Additional Computer 130 in a Storage Area Network 115, thereby providing unlimited Additional Storage Space 115 assignable to the Registrant 150 for files, backups, application install packages, offline storage space, other software or any combination thereof (Step 350).

A Portal Website System

As shown in a streamlined example embodiment of the remote computer and/or server system shown in FIG. 1, a Portal Website 140 may be hosted on at least one hosting Computer 120 and/or Server 125 communicatively coupled to a Network 100 and owned by a Hosting Provider 105. The Portal Website 140 may resolve from a Domain Name 155 registered to a Registrant 150. The Registrant 150 may use a Client 165 communicatively coupled to a Network 100 for connecting to, accessing and displaying the Portal Website 140.

The Portal Website 140 may comprise a website that provides a single or multiple functions via a webpage or website. These functions may further comprise a point of access to information on the World Wide Web from diverse sources in a unified way. The portal may provide a way for the Hosting Provider 105 to provide a consistent look and feel with access and procedures for multiple applications, which otherwise may have been different entities altogether, possibly by resolving the mapped Domain Name 155 to the Portal Website 140. The Portal Website 140 may be a site that provides personalized capabilities to its visitors, providing a pathway to other content, described in more detail below. The Portal Website 140 may additionally have administrative tools or other software all in a single place to administer all necessary applications and utilities to the Registrant 150.

Figure 4:
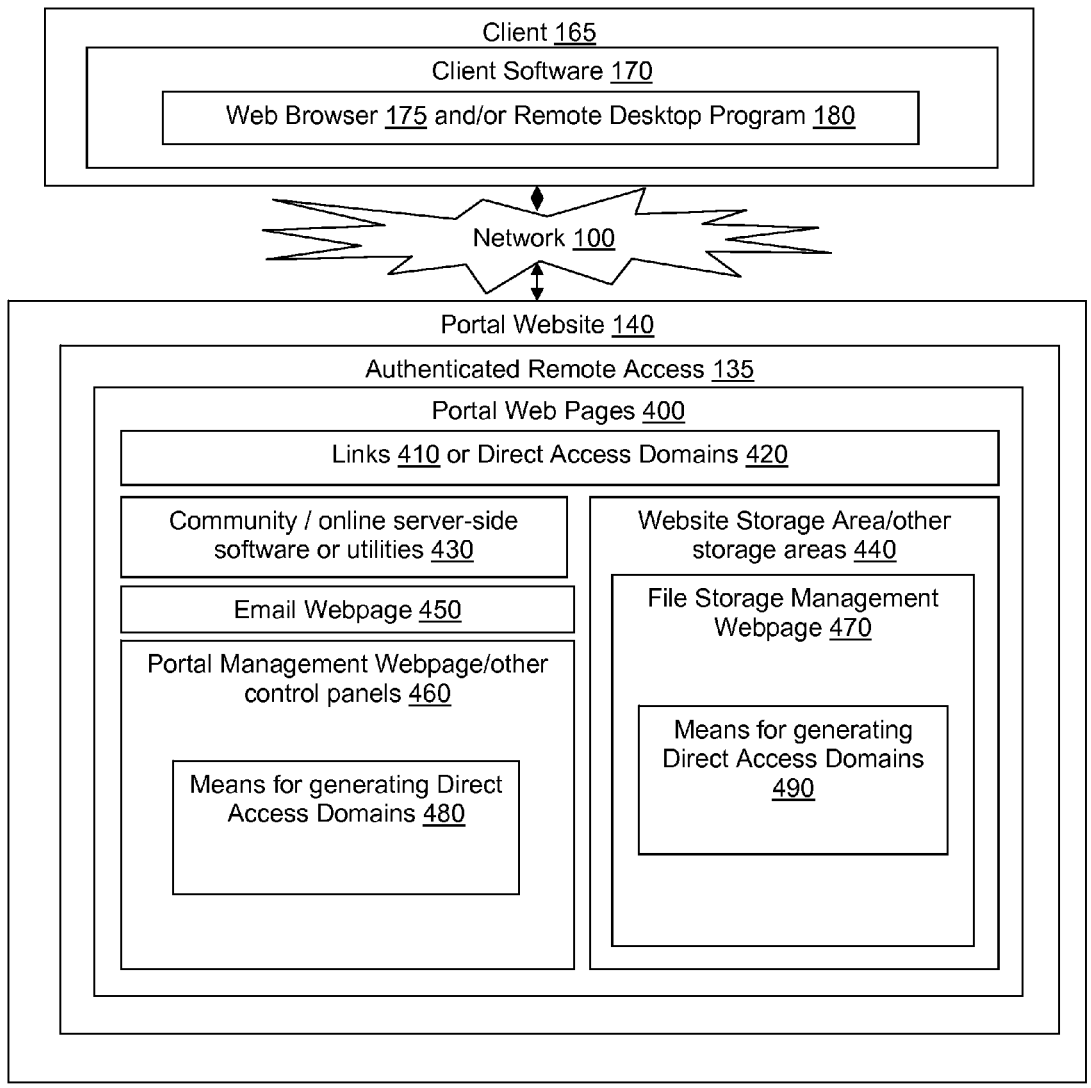
FIG. 4 illustrates a possible embodiment of a portal on a remote computer or server system.

As shown in a more detailed example embodiment of the Portal Website shown in FIG. 4, a Client 165 may be communicatively coupled to a Network 100 for connecting to, accessing and displaying the Portal Website 140. The Client 165 may use Client Software 170, which may include a Web Browser 175 and/or a Remote Desktop Program 180 to connect to, access through Authenticated Remote Access 135, and display the Portal Website 140.

The Registrant 150 may access the Portal Website 140 by being authenticated using means disclosed elsewhere in this application and incorporated herein by reference. The Domain Name 155 belonging to the Registrant 150 may resolve after being mapped, to the Portal Website 140. In other words, by entering the Domain Name 155 into a Web Browser 175 or other compatible Client Software 170 on a Client 165, the previously mapped Domain Name 155 may resolve to the Registrant's 150 Portal Website 140.

The Portal Website 140 may further comprise a plurality of Portal Web Pages 400 accessible via a plurality of Links 410, Direct Access Domains 420 or other means of selecting Portal Web Pages 400 disclosed in detail elsewhere in this application. The Portal Web Pages 400 may further comprise at least one online Community and/or other online software or utilities 430, at least one Website Storage Area and/or other storage areas 440, at least one Management Webpage and/or other control panels 460 accessible to the Registrant 150 after successful authentication, at least one Email Webpage 450, any of the aforementioned or any combination thereof.

The online Community 430 may further comprise access to one or more Online Vendors 190 who may or may not be members of the online Community 430 and may provide the online software or utilities added to the Portal Website 140. The online Community 430 may further comprise a Hosting Provider 105, a plurality of additional partners or customers accessing the online Community 430, the Online Vendors 190 or any combination thereof. The Online Vendors 190 or additional partners may provide a plurality of help instructions for products provided, and means for the Online Vendors 190 or other partners to facilitate installations, patches, upgrades or backups of software or utilities and related files used in conjunction with the Portal Website 140.

The plurality of online Community 430 customers may desire to submit feedback regarding the products provided on the online Community 430. To facilitate this, the online Community 430 may further provide means to submit feedback to the Online Vendors 190 or other partners and/or means to contact technical support provided by the Online Vendors 190 or other partners regarding the software, utilities or other products. The Online Vendors 190 or other partners may further desire means for customers to pay for the software, utilities or other products provided on the online Community 430. Such means to pay for such products may be provided as part of the online Community 430 accessible through the Portal Website 140.

The online Community 430 as previously disclosed may also be used to access online server-side software or utilities 430. Cloud computing as disclosed elsewhere in this application and incorporated herein by reference may also be used by the Registrant to access the online server-side or other software or utilities 430 which may be purchased and/or added, to the Portal Website 140.

Online server-side software or utilities 430 may be accessible via Links 410, Direct Access Domains 420 or other means of selecting and accessing online server-side software or utilities 430. The online server-side software or utilities 430 which exist on the Portal Website 430 or which may be purchased and/or added to the Portal Website 140 may further comprise server-side applications. Server-side applications may be defined as applications which are executed on a hosting Computer 120 or Server 125 and displayed on the Client 165. Non-limiting examples of software which utilizes a server-side environment includes ASP, PHP, CGI/Perl, and may dynamically display information from MSSQL or MySQL databases as are known in the art.

The Website Storage Area 440 may be any means of storage for storing files or other information related to the Portal Website 140. As shown in the streamlined example embodiment shown in FIG. 1 and the more detailed example embodiment shown in FIG. 5, the Website Storage Area 440 may be used for storing files, documents, backups, application or other install packages, software or any other needed means of online or offline storage space, or any combination thereof relating to remote access to the Operating System, file system, software or utilities and/or the Portal Website 140, including, but not limited to the online Community and/or online server-side software or utilities 430 or any utilized cloud-computing applications on the Portal Website 140 or downloaded and included in the Portal Website 140.

Figure 5:
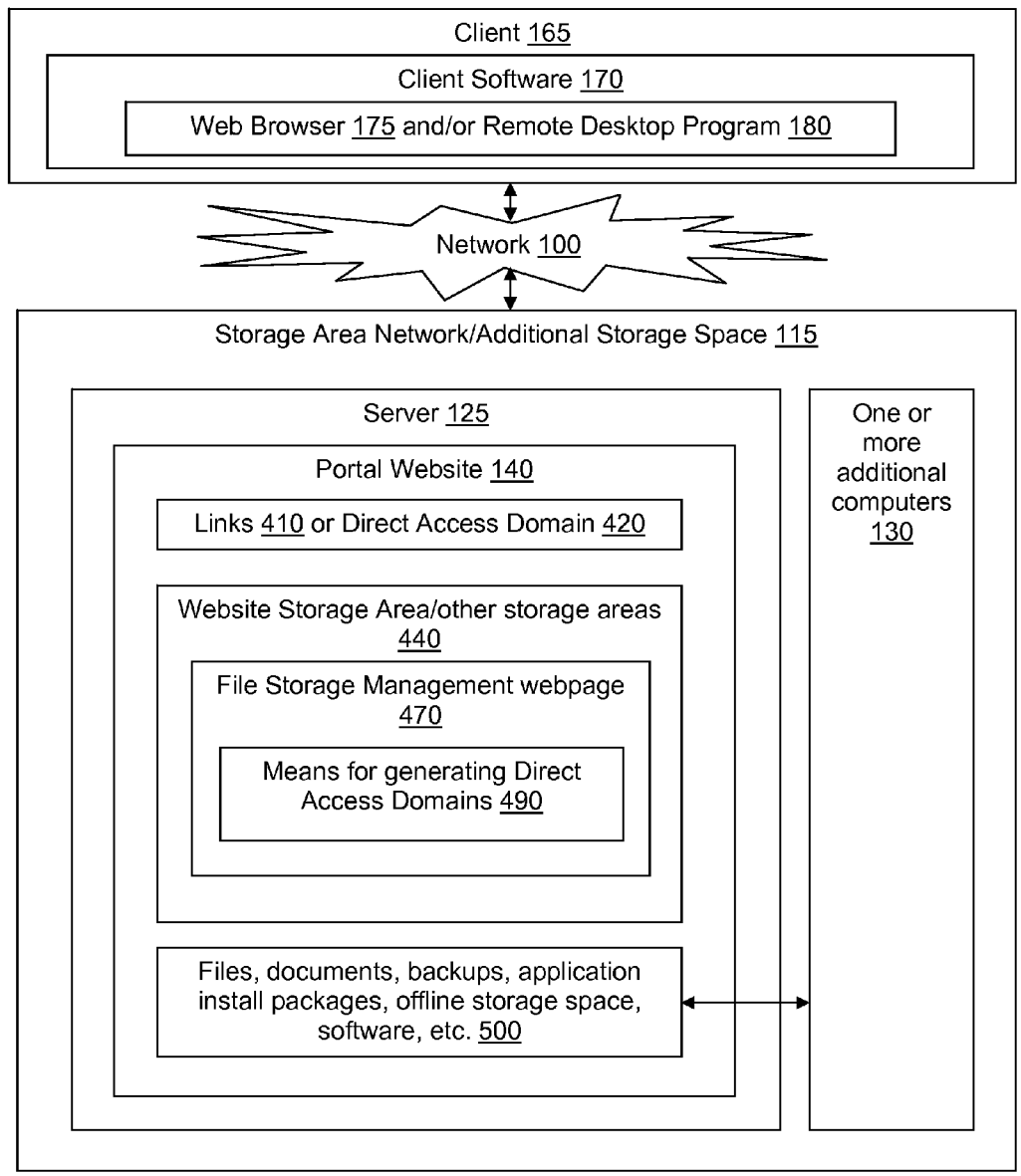
FIG. 5 illustrates a possible embodiment of a website storage area on a remote computer or server system.

As shown in the streamlined example embodiment shown in FIG. 1 and the more detailed example embodiment shown in FIG. 5, The Website Storage Area 440 may be hosted on at least one hosting Computer 120 or Server 125 which may be communicatively coupled to a Network 100 and owned by a Hosting Provider 105. The Website Storage Area 440 may further be contained within the Portal Website 140 which may resolve from the Domain Name 155 and may also be hosted by the Hosting Provider 105. A Registrant 150 may use the Domain Name 155 in conjunction with a Client 165 to connect to, access and display the Website Storage Area 440 and any related files, documents, backups, application install packages, offline storage space, software, etc. 500. Access may be provided after Authenticated Remote Access 135 is provided to the Registrant 150.

The Website Storage Area 440 may further be part of a Storage Area Network 115 wherein the hosting Computer 120 and/or Server 125 may be communicatively coupled with at least one Additional Computer 130 to provide unlimited Additional Storage Space 115 as needed by the Registrant 150 to the Website Storage Area or any other storage areas 440.

The Website Storage Area 440 may further comprise a File Storage Management Webpage 470 which works on principles similar to the Portal Management Webpage 460, described in greater detail below.

The File Storage Management Webpage 470 may further comprise the ability to store and access the files or documents within the Website Storage Area 440, transmit and receive files between the Client 165 and the Computer 120 and/or Server 125, may be displayed in a Web Browser with the ability to access, organize and download files to the Client 165 as needed and may be displayed in a Web Browser with the ability to access, organize and download files between the Additional Computers 130 within the Storage Area Network 115 as needed.

The Portal Management Webpage 460 and/or File Storage Management Webpage 470 may include, be independent from, or may be a part of any control panel on the Portal Website 140, and may include any means of controlling the Portal Website 140 or the display of the Portal Web Pages 400 or files, documents, backups, application install packages, offline storage space, software, etc. 500. Any other related control panel environment known in the art may also be used to control the environment of the Portal Website 140 or any of the Portal Web Pages 400.

The Portal Management Webpage 460 and/or the File Storage Management Webpage 470 may further be used in conjunction with the Hosting Control Center 145 to automatically install on the hosting Computer 120 or Server 125 as necessary, the most recent version of one or more patches, upgrades, backups, applications, utilities or any combination thereof utilizing methods for installing these, disclosed elsewhere in this application and incorporated herein by reference.

The Portal Website 140 may make use of the Portal Management Webpage and/or other control panels 460 and/or the File Storage Management Webpage 470 as a means for generating, via input on the management web pages, one or more Direct Access Domains 420 for the Portal Web Pages 400 and the Website Storage Area or other storage areas 440 respectively.

A Direct Access Domain 420 may comprise at least one sub-domain concatenated to the Domain Name 155, the Direct Access Domains 420 allowing direct access to the online Community or other online software or utilities 430, the Website Storage Area or other storage areas 440 including related files, documents, backups, application install packages, offline storage space, software, etc. 500, the Portal Management Webpage or other control panels 460, or any combination thereof when the Direct Access Domain 420 is entered into a Client Software 170 application on the Client 165. Only a properly-authenticated Registrant 150 will be provided access to the functionality on the Portal Management Webpage 460 or the File Storage Management Webpage 470.

The Portal Management Webpage or other control panels 460 and/or the File Storage Management Webpage 470 may then generate a Direct Access Domain 420 for the selected Portal Web Pages 400 or files, documents, backups, application install packages, offline storage space, software, etc. 500 in the Website Storage Area 440 respectively. This may be accomplished by concatenating a sub-domain relating to the desired web page or file to the Registrant's 150 Domain Name 155. A Direct Access Domain 420 is then generated by concatenating at least one sub-domain to the Domain Name 155, with the Direct Access Domain 420 corresponding (i.e., relating in some manner) to the desired Portal Webpage 400 or file, document, backup, application install package, offline storage space, software, etc. 500.

For example, if a Registrant 150 registers the domain name, "johndoe.com," he may then concatenate a sub-domain (e.g., "email") to "johndoe.com" to generate a Direct Access Domain 420 such as "email.johndoe.com." This step may be accomplished by any means of concatenating a sub-domain to a domain name known in the art.

The means for generating Direct Access Domains 480 on the Portal Management Webpage 460 or means for generating Direct Access Domains 490 for the File Storage Management Webpage 470 may comprise web and/or client-based software tool allowing the properly-authenticated Registrant 150 to generate at least one Direct Access Domain 420, each of which may be tied to his Domain Name 155.

In one example embodiment, the means for generating 480, 490 a Direct Access Domain 420 may comprise data entry fields in which the Registrant 150 may enter sub-domains and the domain name(s) for concatenation. It may also contain a data field in which the Registrant 150 may enter a URL for a desired Portal Webpage 400 or file, document, backup, application install package, offline storage space, etc. 500. Alternatively, the Registrant 150 may select domain names, sub-domains, etc. from a list, perhaps in drop-down menu or matrix form. In yet another embodiment, the means for generating 480, 490 may use a software-implemented algorithm to generate suggested Direct Access Domains 420. Each of these means may be implemented by either client or server-side software.

The Direct Access Domain 420 may then be mapped to the appropriate Portal Web Pages or file using means disclosed elsewhere in this application and incorporated herein by reference.

For example, if a Registrant 150 registers the domain name, "johndoe.com," he may then concatenate a sub-domain (e.g., "softwarecommunity," "wordprocessor" or "email") to "johndoe.com" to generate a Direct Access Domain 420 such as "softwarecommunity.johndoe.com," "wordprocessor.johndoe.com" or "email.johndoe.com."

In this example embodiment, the sub-domain need not necessarily have the same name as the Portal Web Page 400 or online server-side software or utilities 430. Any sub-domain may be used, perhaps one that simply refers to the Direct Access Domain's 420 subject matter, (e.g., "email.johndoe.com" as opposed to "gmail.johndoe.com").

Likewise, for purposes of the Website Storage Area 440, if a Registrant 150 registers the domain name, "johndoe.com," he may then concatenate a sub-domain (e.g., "shoppinglist" "budgetproposal" or "taxtable") to "johndoe.com" to generate a Direct Access Domain 420 such as "shoppinglist.johndoe.com," "budgetproposal.johndoe.com" or "taxtable.johndoe.com." Additional sub-domains, extensions, detailed sub-domains etc. may be used to specifically identify types of documents, etc. (e.g. "budgetproposal.doc.johndoe.com," "taxtablespreadsheet.johndoe.com" etc.)

In this example embodiment, the sub-domain need not necessarily have the same name as the desired document, file or online server-side software or utilities 430. Any sub-domain may be used, perhaps one that simply refers to the Direct Access Domain's 420 subject matter, (e.g., "taxinfo.johndoe.com" as opposed to "taxtablespreadsheet.johndoe.com").

The Portal Webpage 160 may then display, perhaps in list form, the Registrant's 150 Direct Access Domains 420 that may function as Links 410 to Portal Web Pages 400 or files, documents, backups, application install packages, offline storage space, software, etc. 500 in the Website Storage Area 440. Thus, the Registrant 150 may have a single place on the Internet to which they may go to access all of the Registrant's 150 Portal Web Pages 400 or files, documents, backups, application install packages, offline storage space, software, etc. 500

The Portal Web Pages 400 may further comprise an Email Webpage 450 displayed for the purpose of giving the Registrant 150 access to the Registrant's 150 email using any online email service known in the art.

A Method of Hosting a Portal Website With or Without a Website Storage Area

Figure 6:
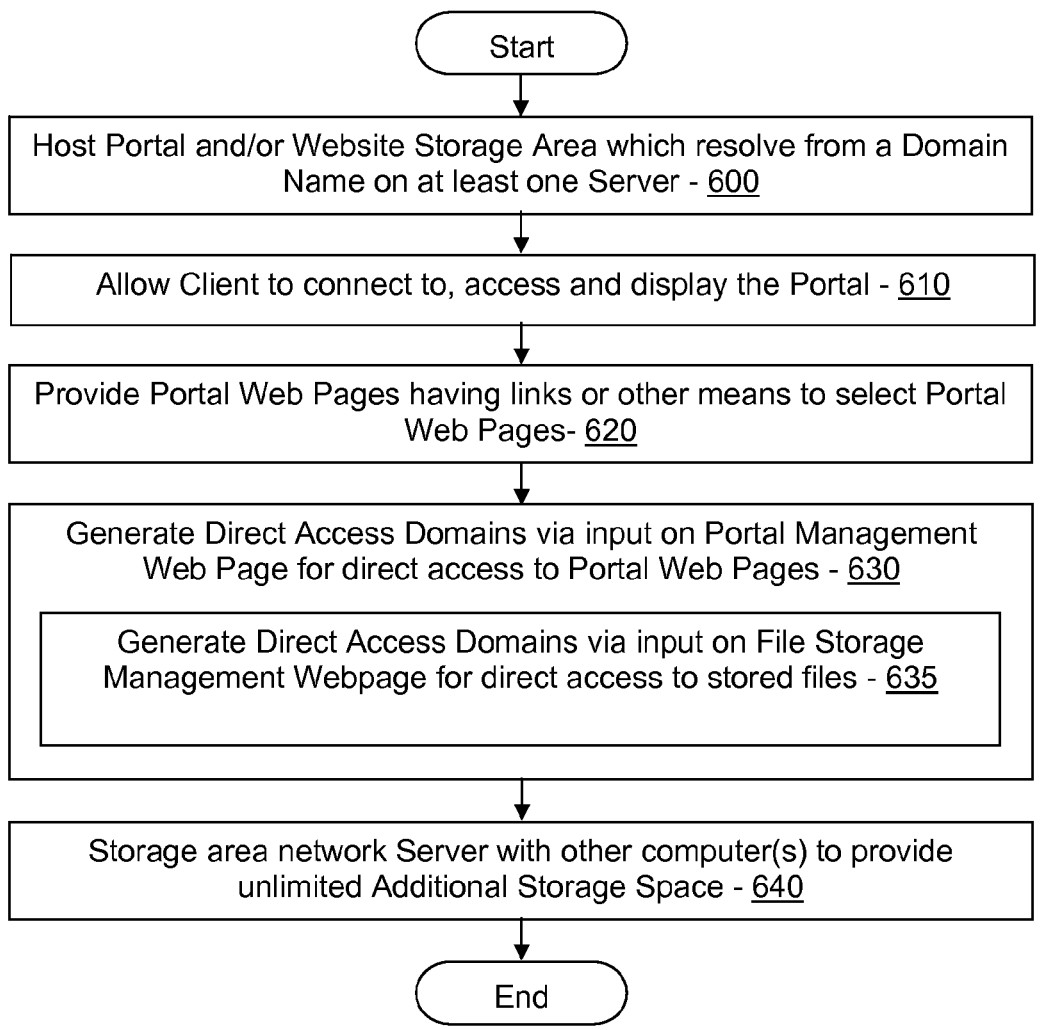
FIG. 6 is a flow diagram illustrating a possible embodiment of a method for hosting a portal on a computer or server in a hosting data center.

In another example embodiment illustrated in FIG. 6, a Portal Website 140 may be hosted with or without at least one Website Storage Area 440, on at least one hosting Computer 120 or Server 125 communicatively coupled to a Network 100 and owned by a Hosting Provider 105, the Portal Website 140 resolving from a Domain Name 155 registered to a Registrant 150 (Step 600). A Client 165, communicatively coupled to the Network 100, may be allowed to connect to, access and display the Portal Website 140 (Step 610).

The Portal Website 140 may further be provided with a plurality of Portal Web Pages 400 on the Portal Website 140 having Links 410 or other means for selecting at least one Community or other online software or utilities 430, any existing Website Storage Area or other storage areas 440, at least one Portal Management Webpage or other control panels 460 accessible to the Registrant 150 after successful authentication, at least one Email Webpage 450, or any combination thereof (Step 620).

The Portal Management Webpage and/or other control panels 460 may be used to generate, via input on the Portal Management Webpage 460, one or more Direct Access Domains 420 comprising at least one sub-domain concatenated to the Domain Name 155, the Direct Access Domains 420 allowing direct access to the Community or other online software or utilities 430, any existing Website Storage Area or other storage areas 440, the Portal Management Webpage or other control panels 460, at least one Email Webpage 450, or any combination thereof when the Direct Access Domain 420 is entered into an Client Software 170 on the Client 165 (Step 630).

Likewise, the File Storage Management Webpage 470 may be used to generate, via input on the File Storage Management Webpage 470, one or more Direct Access Domains 420 comprising at least one sub-domain concatenated to the Domain Name 155, the Direct Access Domains 420 allowing direct access to any existing Website Storage Area or other storage areas 440 including files, documents, backups, application install packages, offline storage space, software etc. 500 when the Direct Access Domain 420 is entered into the Client Software 170 on the Client 165 (Step 635).

The hosting Computer 120 and/or Server 125 may be storage area networked with at least one Additional Computer 130, thereby providing unlimited Additional Storage Space 115 assignable to the Registrant 150 for files, backups, application install packages, offline storage space, software or any combination thereof 500 (Step 640).

A Branded and Co-Marketed Domain-Based Thick Client System

Figure 7:
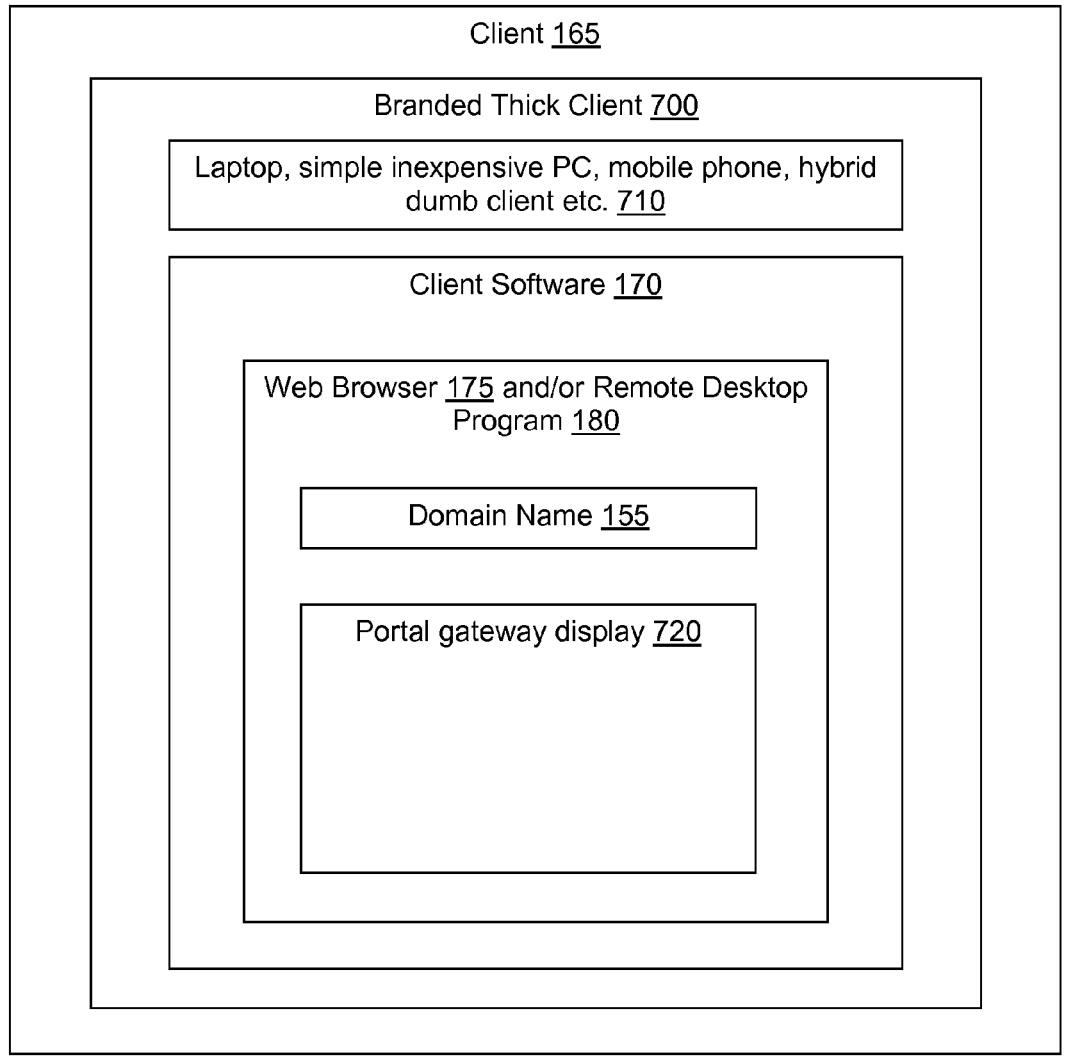
FIG. 7 illustrates a possible embodiment of a branded thick client system.

As shown in the streamlined example embodiment in FIG. 1 and in a more detailed example embodiment of the Client 165 illustrated in FIG. 7, a Thick Client 700 may be branded by a Hosting Provider 105 and communicatively coupled to a Network 100, which may be used for the Client 165 to remotely access, through cloud computing and via the Branded Thick Client 700, at least one Computer 120 or Server 125, hosted in a Data Center 110 of the Hosting Provider 105 and communicatively coupled to the Network 100.

As shown in FIG. 7, the Branded Thick Client 700 may further comprise a laptop, a mini-laptop, a wireless laptop, a simple inexpensive PC desktop, a thick client integrated into a mobile phone, a hybrid dumb client, any other known thick client, or any combination thereof 710. The Branded Thick Client 700 may have remote desktop and wifi capabilities and may be used to facilitate a Portal Gateway Display 720. This may be accomplished by entering a Domain Name 155 into a Client Software 170 such as a Web Browser 175 and/or a Remote Desktop Program 180. The Portal Gateway Display 720 may then display on the Client 165 the Portal Website 140 and/or remote access to any OS, file system and/or software. The Branded Thick Client 700 may be preferable to thin clients for fast-update applications.

In a non-limiting example embodiment, the Branded Thick Client 700 may be configured to boot automatically to the Browser 175 and/or other Client Software 170 which may then display the Portal Website 140. In such an embodiment, the Browser 175 or other Client Software 170 may display web pages other than the Portal Website 140. In an alternate embodiment, only the Browser 175 may be displayed and run, and only the Portal Website 140 may be displayed on the Browser 175.

The Portal Website 140 may be displayed via the Browser 175 or other Client Software 170 on the Branded Thick Client 700, and the Portal Website 140 may provide a gateway to at least one online Community or other online software or utilities 430, at least one Website Storage Area or other storage areas 440, at least one Management Webpage or other control panels 460 accessible to the Registrant 150 after successful authentication, at least one Email Webpage 450, any of the aforementioned or any combination thereof. In one embodiment the Portal Website 140 may resolve from a Domain Name 155 registered to a Registrant 150 provided in conjunction with the Branded Thick Client 700.

A Storage Area Network 115 may also be used, accessible to the Branded Thick Client 700 and connecting the Branded Thick Client 700 with Additional Computers 130 in the Storage Area Network 115, thereby expanding the storage space on the Branded Thick Client 700 to include unlimited additional storage space 115 assignable to the Registrant 150 for files, backups, application install packages, offline storage space, software or any combination thereof.

A Method for Branding and Co-Marketing a Domain-Based Thick Client System

Figure 8:
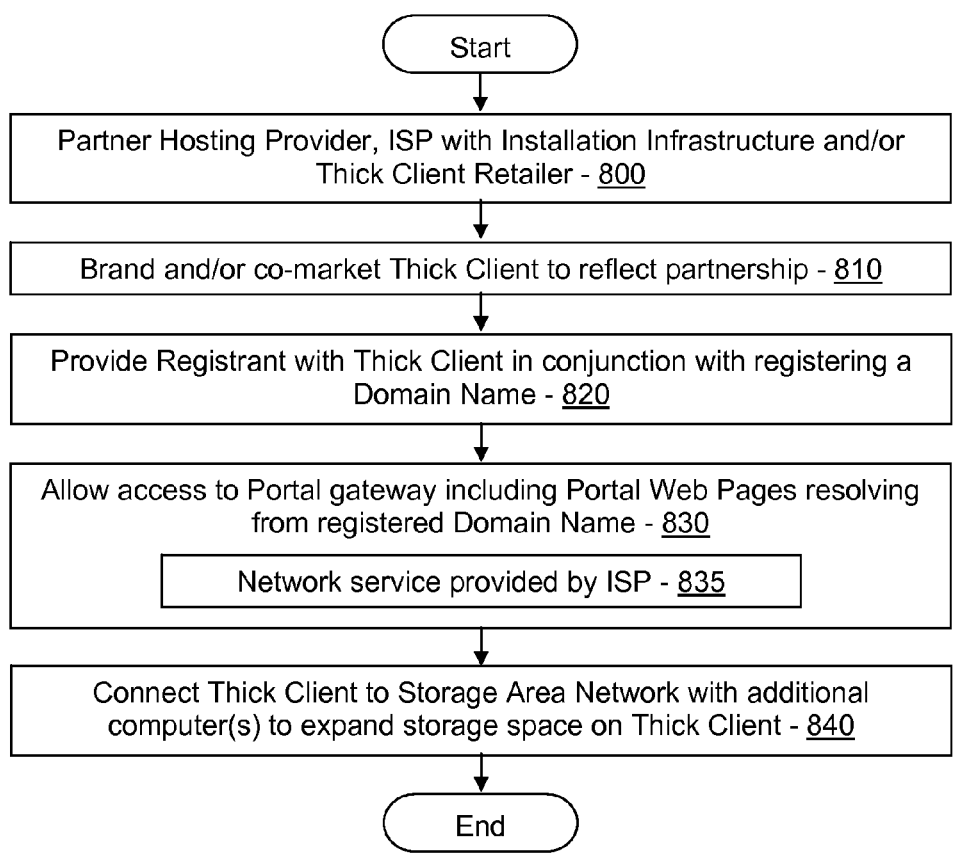
FIG. 8 is a flow diagram illustrating a possible embodiment of a method for branding and co-marketing a branded thick client system.

In another example embodiment illustrated in FIG. 8, a Hosting Provider 105 a broadband or Internet service provider (ISP) with a broadband or other Internet Service and/or Installation Infrastructure 160, a thick Client Retailer 185 or any combination thereof may combine to form a partnership (Step 800).

The partnership may work together to brand and/or co-market a Thick Client 700 to reflect the partnership between the Hosting Provider 105, the ISP, the thick Client Retailer 185 or any combination thereof (Step 810), and the partnership may then provide a Registrant 150 with the branded and/or co-marketed Thick Client 700 in conjunction with registering a Domain Name 155 to the Registrant 150 (Step 820).

This Thick Client 700 may then be used for Authenticated Remote Access 135 to a Portal Website 140, displayed via a Browser 175 or other Client Software 170 on the branded and co-marketed Thick Client 700. The Portal Website 140 may be used to provide a gateway to at least one Community Website or other online software or utilities 430, at least one Website Storage Area or other storage areas 440, at least one Management Webpage or other control panels accessible to the Registrant after successful authentication 460, at least one Email Webpage 450, a remote operating system, including utilities and software, or any combination thereof (Step 830). Access to the Portal Website 140 may be accomplished by resolving from the Domain Name 155 registered to the Registrant 150 (Step 830), wherein network service is provided and/or installed by the ISP (Step 835).

The branded and co-marketed Thick Client 700 may then be connected to a Storage Area Network 115, with Additional Computers 130 in the Storage Area Network 115, thereby expanding the storage space on the branded and co-marketed Thick Client 700 to include unlimited Additional Storage Space 115 for files, documents, backups, application install packages, offline storage space, software, etc. 500 or any combination thereof, with disk space assignable to the Registrant 150 (Step 840).

A Branded and Co-Marketed Domain-Based Thin Client System

Figure 9:
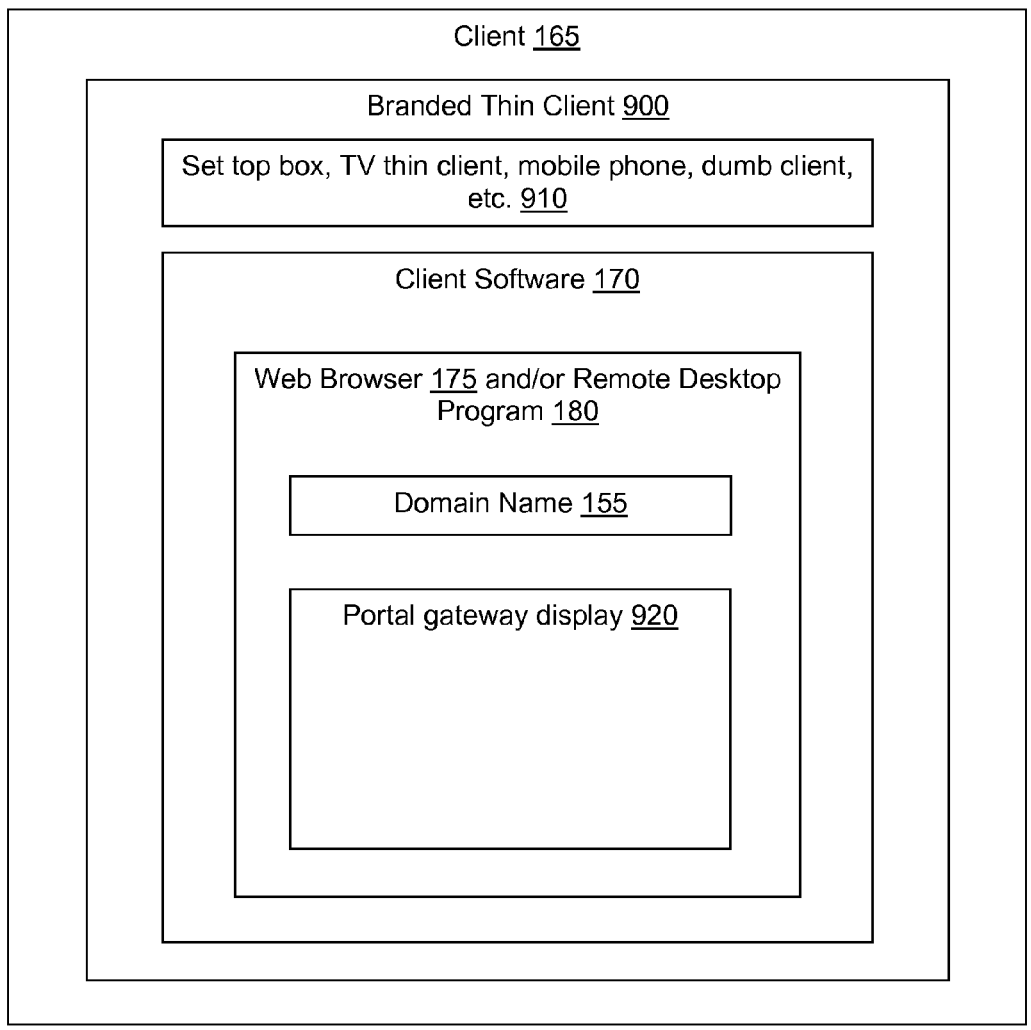
FIG. 9 illustrates a possible embodiment of a branded thin client system.

As shown in the streamlined example embodiment in FIG. 1 and in a more detailed example embodiment of the Client 165 illustrated in FIG. 9, a Thick Client 900 may be branded by a Hosting Provider 105 and communicatively coupled to a Network 100, which may be used for the Client 165 to remotely access, through cloud computing and via the Branded Thin Client 900, at least one Computer 120 or Server 125, hosted in a Data Center 110 of the Hosting Provider 105 and communicatively coupled to the Network 100.

As shown in FIG. 9, the Branded Thin Client 900 may further comprise a set top box, a thin client connected to a TV for TV display, a thin client integrated into a mobile phone and a dumb client, any other known thin client, or any combination thereof 910. The Branded Thin Client 900 may have remote desktop and wifi capabilities and may be used to facilitate a Portal Gateway Display 920. This may be accomplished by entering a Domain Name 155 into a Client Software 170 such as a Web Browser 175 and/or a Remote Desktop Program 180. The Portal Gateway Display 920 may then display on the Client 165 the Portal Website 140 and/or remote access to any OS, file system and/or software.

In a non-limiting example embodiment, the Branded Thin Client 900 may be configured to boot automatically to the Browser 175 and/or other Client Software 170 which may then display the Portal Website 140. In such an embodiment, the Browser 175 or other Client Software 170 may display web pages other than the Portal Website 140. In an alternate embodiment, only the Browser 175 may be displayed and run, and only the Portal Website 140 may be displayed on the Browser 175.

The Portal Website 140 may be displayed via the Browser 175 or other Client Software 170 on the Branded Thin Client 900, and the Portal Website 140 may provide a gateway to at least one online Community or other online software or utilities 430, at least one Website Storage Area or other storage areas 440, at least one Management Webpage or other control panels 460 accessible to the Registrant 150 after successful authentication, at least one Email Webpage 450, any of the aforementioned or any combination thereof. In one embodiment the Portal Website 140 may resolve from a Domain Name 155 registered to a Registrant 150 provided in conjunction with the Branded Thin Client 900.

A Storage Area Network 115 may also be used, accessible to the Branded Thin Client 900 and connecting the Branded Thin Client 900 with Additional Computers 130 in the Storage Area Network 115, thereby expanding the storage space on the Branded Thin Client 900 to include unlimited additional storage space 115 assignable to the Registrant 150 for files, backups, application install packages, offline storage space, software or any combination thereof.

A Method for Branding and Co-Marketing a Domain-Based Thick Client System

Figure 10:
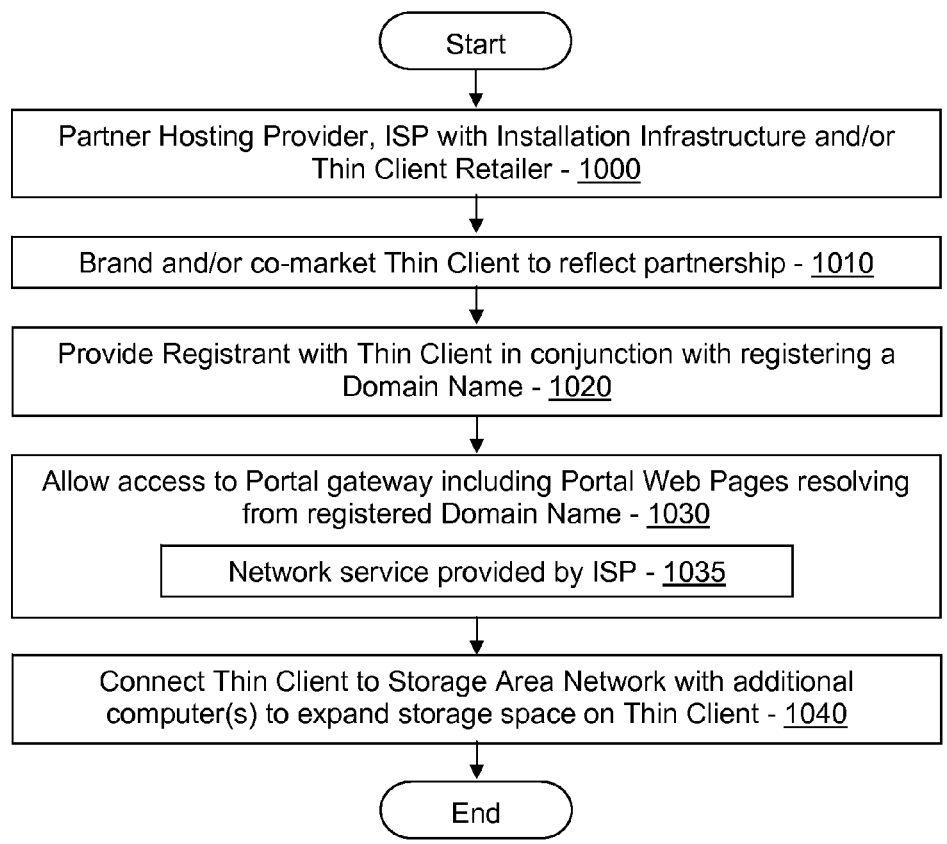
FIG. 10 is a flow diagram illustrating a possible embodiment of a method for branding and co-marketing a branded thin client system.

In another example embodiment illustrated in FIG. 10, a Hosting Provider 105 a broadband or Internet service provider (ISP) with a broadband or other Internet Service and/or Installation Infrastructure 160, a thin Client Retailer 185 or any combination thereof may combine to form a partnership (Step 1000).

The partnership may work together to brand and/or co-market a Thin Client 900 to reflect the partnership between the Hosting Provider 105, the ISP, the thick Client Retailer 185 or any combination thereof (Step 1010), and the partnership may then provide a Registrant 150 with the branded and/or co-marketed Thin Client 900 in conjunction with registering a Domain Name 155 to the Registrant 150 (Step 1020).

This Thin Client 900 may then be used for Authenticated Remote Access 135 to a Portal Website 140, displayed via a Browser 175 or other Client Software 170 on the branded and co-marketed Thin Client 900. The Portal Website 140 may be used to provide a gateway to at least one Community Website or other online software or utilities 430, at least one Website Storage Area or other storage areas 440, at least one Management Webpage or other control panels accessible to the Registrant after successful authentication 460, at least one Email Webpage 450, a remote operating system, including utilities and software, or any combination thereof (Step 1030). Access to the Portal Website 140 may be accomplished by resolving from the Domain Name 155 registered to the Registrant 150 (Step 1030), wherein network service is provided and/or installed by the ISP (Step 1035).

The branded and co-marketed Thin Client 900 may then be connected to a Storage Area Network 115, with Additional Computers 130 in the Storage Area Network 115, thereby expanding the storage space on the branded and co-marketed Thin Client 900 to include unlimited Additional Storage Space 115 for files, documents, backups, application install packages, offline storage space, software, etc. 500 or any combination thereof, with disk space assignable to the Registrant 150 (Step 1040).

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising a server computer communicatively coupled to a network and configured to:
   A) register a domain name to a registrant;
   B) host a portal website resolving from said domain name and comprising:
   i) a landing page providing access to a plurality of files from a plurality of diverse sources on said network, said plurality of files comprising a plurality of web pages, electronic documents, software, utilities or backup files;
   ii) a control panel configured to receive from said registrant:
      a) a selection of a theme configured to display said plurality of files in a unified way on said portal website;
      b) a key word or phrase topically relevant to one of said plurality of files; and
      c) a network path for accessing and rendering said one of said plurality of files;
   iii) a software-based virtual desktop environment running on a partition of said server computer:
      a) comprising:
         1) at least one common kernel, system library, configuration and program file shared with an operating system installed on said server computer; and 2) a desktop work environment for a graphical windows workstation comprising one or more office and internet software tools; and
   b) configured to operate and reboot independent of at least one additional virtual environment;
C) generate a uniform resource locator comprising said key word or phrase concatenated, as a sub domain, to said domain name;
D) map said uniform resource locator to said one of said plurality of files via said network path;
E) receive a hypertext transfer protocol request comprising said uniform resource locator; and
F) responsive to receiving said hypertext transfer protocol request:
   a) render, within said portal website, said one of said plurality of files; and
   b) transmit a rendering of said one of said plurality of files to a client computer communicatively coupled to said network.

2. The system of claim 1, wherein said domain name is mapped to said virtual desktop environment and said uniform resource locator is mapped to said file:
   i) using one or more methods and technologies for mapping said domain name, said sub domain, said uniform resource locator or an internet protocol address to said virtual desktop environment, or to said file, said one or more methods or technologies comprising any combination of:
      a) uniform resource locator forwarding;
      b) redirecting;
      c) masking; and
      d) implementing one or more aliases to map said server computer to one or more domain names; and
   ii) via a client-based software tool or a server-based software tool configured to automatically map said domain name, said sub domain, said uniform resource locator or said internet protocol address to said virtual desktop environment, or to said file.

3. The system of claim 1, wherein said control panel is configured to:
   i) authenticate said registrar to said server computer or said operating system;
   ii) install or remove on said server computer or said operating system:
      a) one or more software applications;
      b) one or more operating system or software patches;
      c) one or more operating system or software updates; and
      d) one or more operating system or software backups;
   iii) change one or more passwords for authentication to said operating system or said server computer;
   iv) set one or more configuration settings for said operating system or said server computer;
   v) migrate said one or more software applications between one or more hosting accounts or one or more domains;
   vi) restart said server computer or said operating system;
   vii) independently reboot each of one or more operating systems comprising said operating system, or each of one or more virtual desktop environments comprising said virtual desktop environment;
   viii) remotely install said one or more software applications; and
   ix) remotely reboot said one or more server computers or said one or more virtual desktop environments.

4. The system of claim 1, wherein said control panel is configured to:
   i) authenticate said registrant to said virtual environment;
   ii) install or remove in said virtual environment:
      a) one or more software applications;
      b) one or more software patches;
      c) one or more software updates;
      d) one or more software backups;
   iii) change one or more passwords for authentication to said virtual environment;
   iv) set one or more configuration settings for said virtual environment;
   v) restart said virtual environment;
   vi) remotely install said one or more software applications;
   vii) remotely restart said virtual desktop environment;
   viii) establish a remote access gateway to said client computer via a remote desktop program;
   ix) receive, via data entry fields on said client computer, said sub domain to be concatenated to said domain name; and
   x) receive, via said data entry fields on said client computer, said network path required to access said file, said file comprising a software application or a document on said server.

5. The system of claim 1, further comprising a remote desktop software application configured to:
   i) run a configuration interface on said server computer while rendering a user interface remotely on said client computer, said configuration interface comprising a remote desktop protocol gateway configured to establish a remote access gateway to remotely control said server computer over said network;
   ii) remotely access a file system, one or more software applications and one or more utilities within said operating system; and
   iii) upload and download files between said server computers and said client computer.

6. The system of claim 1, further comprising an online storage comprising:
   i) a server architecture communicatively coupling said server computer, via said network, to a server cluster, a storage virtualization or a cloud storage comprising one or more remote storage devices comprising one or more additional computers, servers or disk arrays;
   ii) any combination of a storage area network, a network attached storage or a direct attached storage:
   iii) one or more files comprising said file; and
   iv) said file being granted access to all of said one or more remote storage devices.

7. The system of claim 1, further comprising an online community comprising:
   i) one or more software vendors providing software to said online community via cloud computing;
   ii) said one or more software vendors, a hosting provider and a plurality of one or more additional partners or vendors;
   iii) additional software or utilities installed onto said one or more server computers from said one or more software vendors;
   iv) access to said one or more software or utilities.

8. The system of claim 1, wherein said portal website further comprises any combination of:
   i) access, via said one or more links, to an online community comprising one or more software vendors providing software to the online community via cloud computing;
   ii) a file storage management webpage configured to display, access, organize and download one or more files; and
   iii) one or more data fields configured to receive said sub domain and said network path.

9. A method, comprising:
A) registering, by a server computer communicatively coupled to a network, a domain name to a registrant;
B) hosting, by said server computer, a portal website resolving from said domain name and comprising:
   i) a landing page providing access to a plurality of files from a plurality of diverse sources on said network, said plurality of files comprising a plurality of web pages, electronic documents, software, utilities or backup files;
   ii) a control panel configured to receive from said registrant:
      a) a selection of a theme configured to display said plurality of files in a unified way on said portal website;
      b) a key word or phrase topically relevant to one of said plurality of files; and
      c) a network path for accessing and rendering said one of said plurality of files;
   iii) a software-based virtual desktop environment running on a partition of said server computer:
      a) comprising:
         1) at least one common kernel, system library, configuration and program file shared with an operating system installed on said server computer; and
         2) a desktop work environment for a graphical windows workstation comprising one or more office and internet software tools; and
      b) configured to operate and reboot independent of at least one additional virtual environment;
C) generating, by said server computer, a uniform resource locator comprising said key word or phrase concatenated, as a sub domain, to said domain name;
D) mapping, by said server computer, said uniform resource locator to said one of said plurality of files via said network path;
E) receiving, by said server computer, a hypertext transfer protocol request comprising said uniform resource locator; and
F) responsive to receiving said hypertext transfer protocol request:
   i) rendering, by said server computer, within said portal website, said one of said plurality of files; and
   ii) transmitting, by said server computer, a rendering of said one of said plurality of files to a client computer communicatively coupled to said network.

10. The method of claim 9, wherein said domain name is mapped to said virtual desktop environment and said uniform resource locator is mapped to said file:
   i) using one or more methods and technologies for mapping said domain name, said sub domain, said uniform resource locator or an internet protocol address to said virtual desktop environment, or to said file, said one or more methods or technologies comprising any combination of:
      a) uniform resource locator forwarding;
      b) redirecting;
      c) masking; and
      d) implementing one or more aliases to map said server computer to one or more domain names; and
   ii) via a client-based software tool or a server-based software tool configured to automatically map said domain name, said sub domain, said uniform resource locator or said internet protocol address to said virtual desktop environment, or to said file.

11. The method of claim 9, further comprising the steps of:
   i) authenticating, by said server computer, a registrar of said domain name to said server computer or said operating system;
   ii) installing or removing, by said server computer, on said server computer or said operating system:
      a) one or more software applications;
      b) one or more operating system or software patches;
      c) one or more operating system or software updates; and
      d) one or more operating system or software backups;
   iii) changing, by said server computer, one or more passwords for authentication to said operating system or said server computer;
   iv) setting, by said server computer, one or more configuration settings for said operating system or said server computer;
   v) migrating, by said server computer, said one or more software applications between one or more hosting accounts or one or more domains;
   vi) restarting, by said server computer, said server computer or said operating system;
   vii) independently rebooting, by said server computer, each of one or more operating systems comprising said operating system, or each of one or more virtual desktop environments comprising said virtual desktop environment;
   viii) remotely installing, by said server computer, said one or more software applications; and
   ix) remotely rebooting, by said server computer, said one or more server computers or said one or more virtual desktop environments.

12. The method of claim 9, further comprising the steps of:
   i) authenticating, by said server computer, said registrant to said virtual environment;
   ii) installing or removing, by said server computer, in said virtual environment:
      a) one or more software applications;
      b) one or more software patches;
      c) one or more software updates; or
      d) one or more software backups;
   iii) changing, by said server computer, one or more passwords for authentication to said virtual environment;
   iv) setting, by said server computer, one or more configuration settings for said virtual environment;
   v) restarting, by said server computer, said virtual environment;
   vi) remotely installing, by said server computer, said one or more software applications;
   vii) remotely restarting, by said server computer, said virtual desktop environment;
   viii) establishing, by said server computer, a remote access gateway to said client computer via a remote desktop program;
   ix) receiving, by said server computer, via data entry fields on said client computer, said sub domain to be concatenated to said domain name; and
   x) receiving, by said server computer, via said data entry fields on said client computer, said network path required to access said file, said file comprising a software application or a document on said server.

13. The method of claim 9, further comprising a remote desktop software application configured to:
   i) run a configuration interface on said server computer while rendering a user interface remotely on said client computer, said configuration interface comprising a remote desktop protocol gateway configured to establish a remote access gateway to remotely control said server computer over said network;

ii) remotely access a file system, one or more software applications and one or more utilities within said operating system; and iii) upload and download files between said server computers and said client computer.

14. The method of claim 9, further comprising an online storage comprising:
   i) a server architecture communicatively coupling said server computer, via said network, to a server cluster, a storage virtualization or a cloud storage comprising one or more remote storage devices comprising one or more additional computers, servers or disk arrays;
   ii) any combination of a storage area network, a network attached storage or a direct attached storage:
   iii) one or more files comprising said file; and
   iv) said file being granted access to all of said one or more remote storage devices.

15. The method of claim 9, further comprising an online community comprising:
   i) one or more software vendors providing software to said online community via cloud computing;
   ii) said one or more software vendors, a hosting provider and a plurality of one or more additional partners or vendors;
   iii) install, by cloud computing additional software or utilities onto said one or more server computers from one or more software vendors; and
   iv) access one or more software or utilities.

16. The method of claim 9, wherein said portal website further comprises any combination of:
   i) access, via said one or more links, to an online community comprising one or more software vendors providing software to the online community via cloud computing;
   ii) a file storage management webpage configured to display, access, organize and download one or more files comprising said file; and
   iii) one or more data fields configured to receive said sub domain and said network path.

* * * * *